(12) United States Patent
Zhang et al.

(10) Patent No.: US 9,094,167 B2
(45) Date of Patent: Jul. 28, 2015

(54) SYSTEM AND METHOD FOR MULTI-USER AND MULTI-CELL MIMO TRANSMISSIONS

(75) Inventors: Jianzhong Zhang, Irving, TX (US); Juho Lee, Gyeonggi-do (KR); Ying-Yang Li, Beijing (CN); Lingjia Liu, Plano, TX (US); Young-Han Nam, Richardson, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 647 days.

(21) Appl. No.: 12/692,385

(22) Filed: Jan. 22, 2010

(65) Prior Publication Data
US 2010/0195599 A1   Aug. 5, 2010

Related U.S. Application Data

(60) Provisional application No. 61/206,597, filed on Feb. 2, 2009.

(51) Int. Cl.
  *H04W 4/00*  (2009.01)
  *H04L 5/00*  (2006.01)

(52) U.S. Cl.
  CPC ............ *H04L 5/0053* (2013.01); *H04L 5/0094* (2013.01); *H04L 5/0007* (2013.01)

(58) Field of Classification Search
  USPC ................................................. 370/329, 341
  See application file for complete search history.

(56) References Cited

U.S. PATENT DOCUMENTS

| | | | |
|---|---|---|---|
| 2004/0131007 A1* | 7/2004 | Smee et al. .................. | 370/208 |
| 2005/0254457 A1 | 11/2005 | Jung et al. | |
| 2007/0066298 A1* | 3/2007 | Hurst ........................... | 455/423 |
| 2008/0260062 A1 | 10/2008 | Imamura | |
| 2010/0056170 A1* | 3/2010 | Lindoff et al. .............. | 455/452.1 |
| 2010/0110901 A1* | 5/2010 | Wong et al. .................. | 370/242 |
| 2010/0189038 A1* | 7/2010 | Chen et al. .................. | 370/328 |
| 2010/0273495 A1* | 10/2010 | Onggosanusi et al. ....... | 455/450 |

FOREIGN PATENT DOCUMENTS

| | | |
|---|---|---|
| EP | 2 352 244 A1 | 8/2011 |
| WO | WO 2008/132073 A1 | 11/2008 |

OTHER PUBLICATIONS

European Search Report dated Aug. 16, 2013 in connection with European Patent Application No. 10152308.2, 8 pages.
First Office Action dated Aug. 28, 2013 in connection with Chinese Application No. 201010118739.4, 13 pages.
3GPP TSG RAN WG1 Meeting #54bis; "Support of DL Higher-Order MIMO Transmission in LTE-Advanced"; NTT DOCOMO; R1-083685; Prague, Czech Republic; Sep. 29-Oct. 3, 2008; 8 pages.
European Office Action dated Feb. 4, 2015 in connection with European Patent Application No. 10152308.2, 6 pages.
3GPP TSG RAN WG1 Meeting #49; "Cyclic Shift Hopping and DM RS Signaling"; R1-072294; Kobe, Japan, May 7-11, 2007; 4 pages.

* cited by examiner

*Primary Examiner* — Brandon Renner
*Assistant Examiner* — Kodzovi Acolatse

(57) ABSTRACT

A base station can communicate with a plurality of subscriber stations in a Multi-User (MU) Multiple-Input Multiple-Output (MIMO) system. The base station includes a transmitter and plurality of antenna configured to transmit control information. The base station can transmit a resource block to a first subscriber station. The resource block includes at least two downlink reference signal (DRS) patterns. The base station can assign a first DRS pattern for use by the first subscriber station. The base station informs the subscriber station regarding the assignment by reserving a state in a downlink grant. In response, the subscriber station can utilize the first DRS pattern as a pilot resource element and, optionally, avoid other DRS patterns.

35 Claims, 15 Drawing Sheets

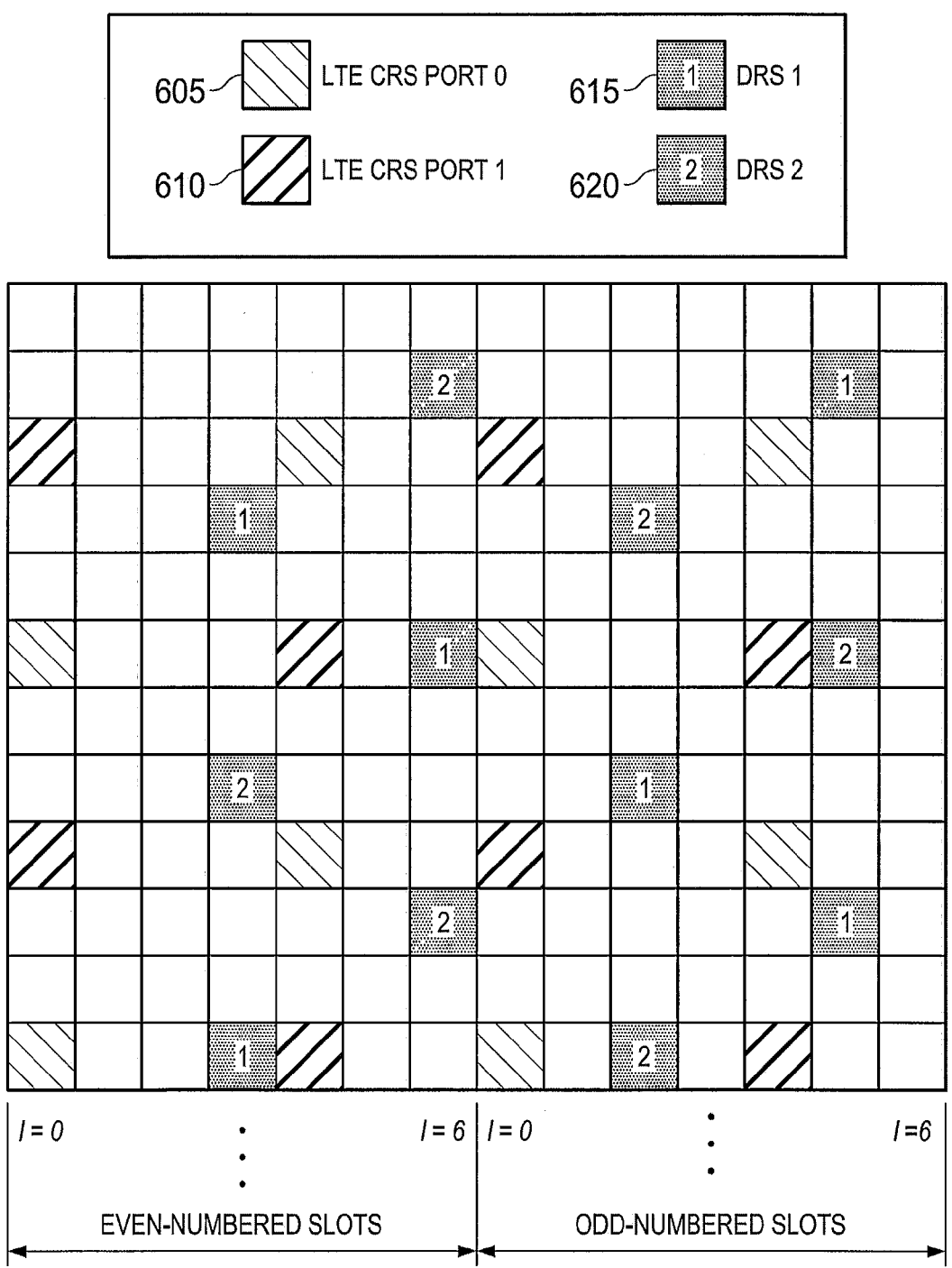

FIG. 6B
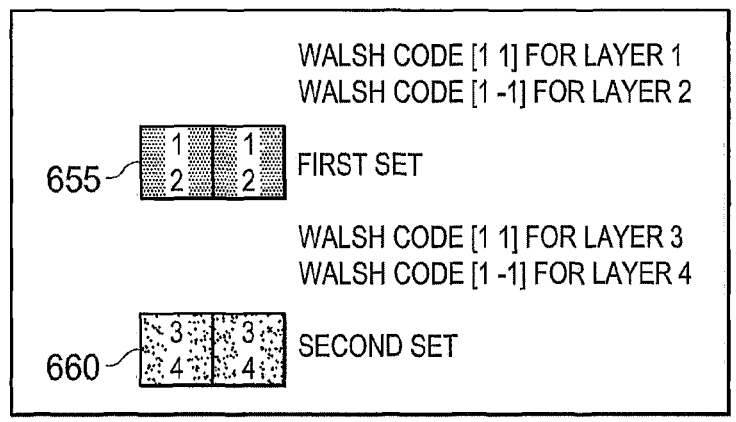
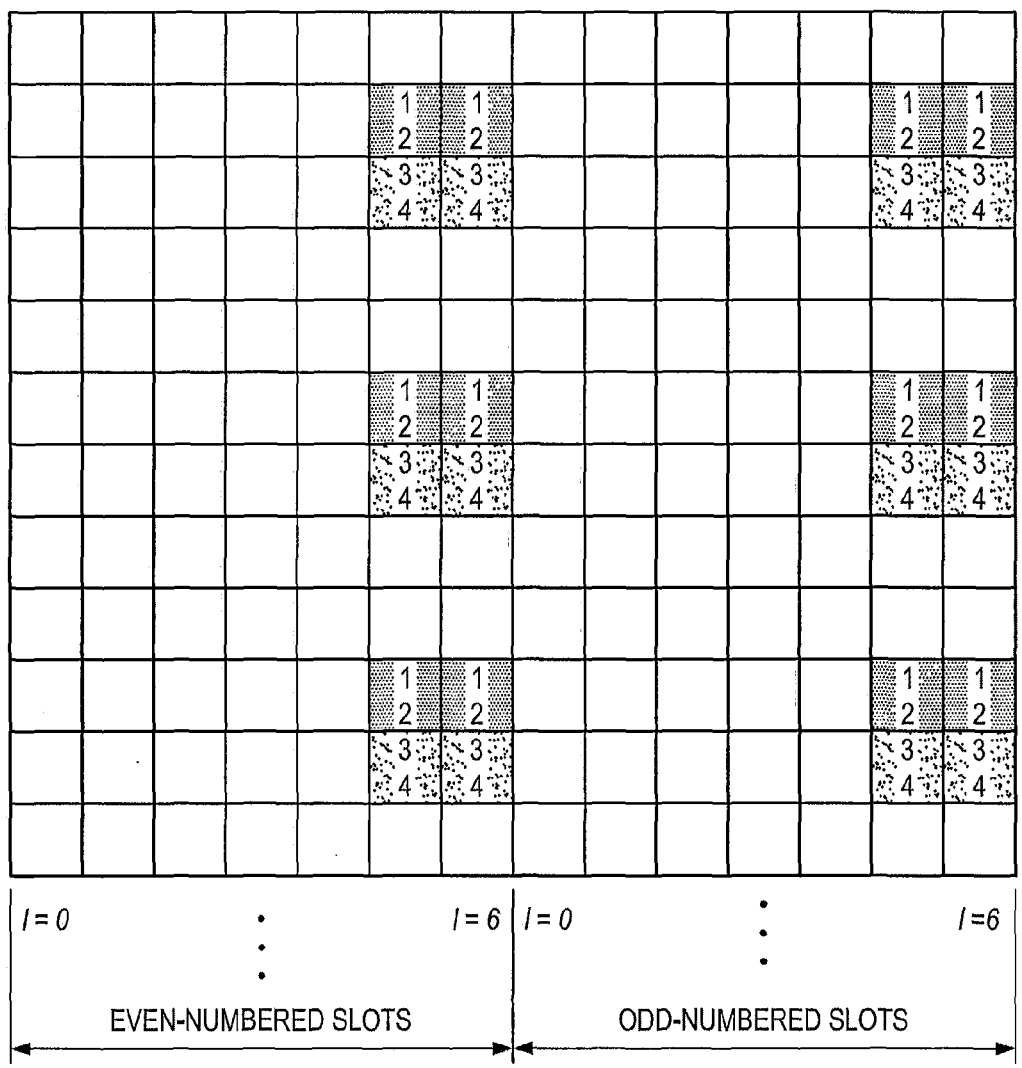

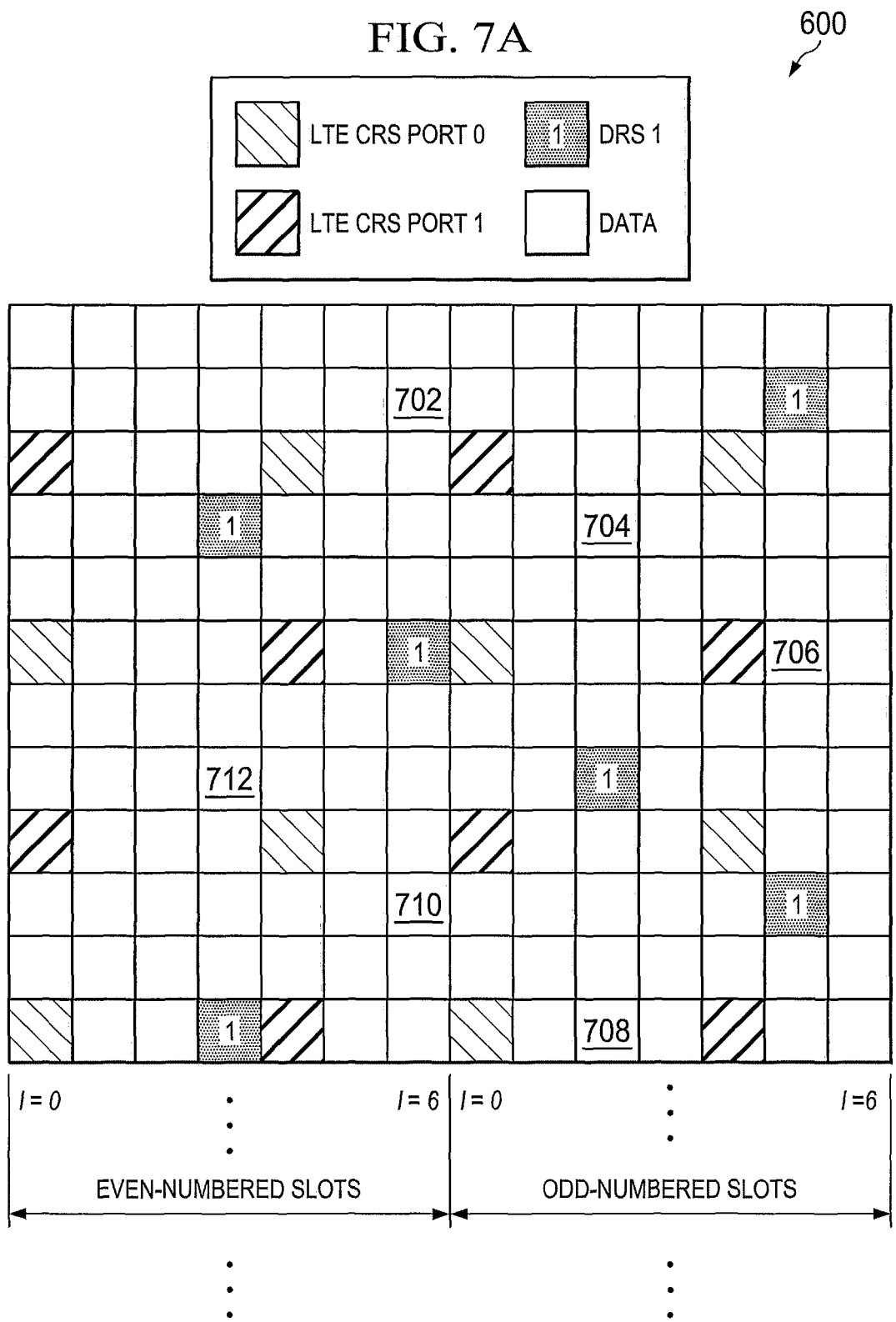

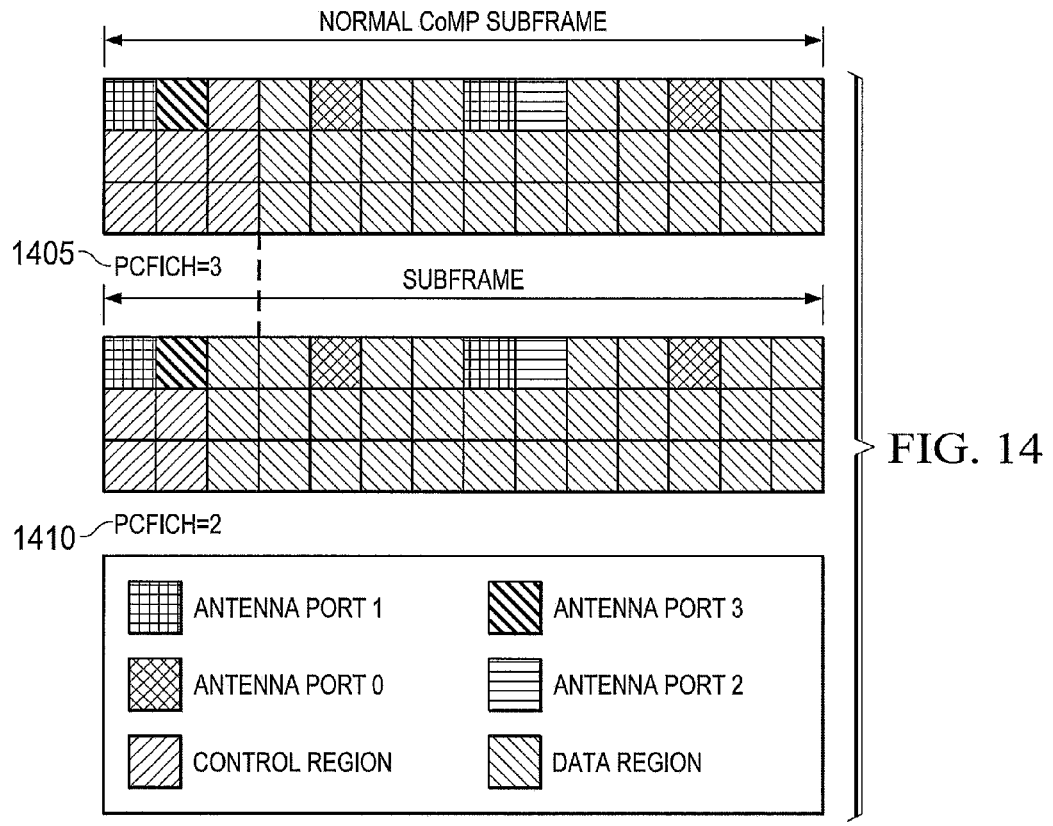
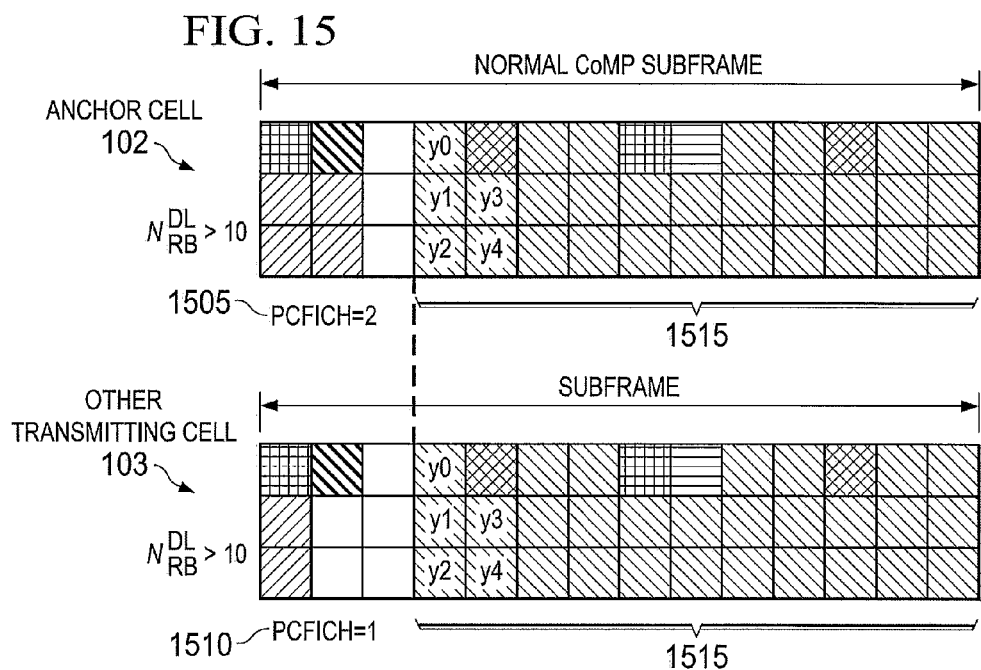

SYSTEM AND METHOD FOR MULTI-USER AND MULTI-CELL MIMO TRANSMISSIONS

CROSS-REFERENCE TO RELATED APPLICATION(S) AND CLAIM OF PRIORITY

The present application is related to U.S. Provisional Patent No. 61/206,597, filed Feb. 2, 2009, entitled "MULTI-USER AND MULT-CELL MIMO TRANSMISSIONS IN WIRELESS COMMUNICATION SYSTEMS". Provisional Patent No. 61/206,597 is assigned to the assignee of the present application and is hereby incorporated by reference into the present application as if fully set forth herein. The present application hereby claims priority under 35 U.S.C. §119(e) to U.S. Provisional Patent No. 61/206,597.

TECHNICAL FIELD OF THE INVENTION

The present application relates generally to wireless communications and, more specifically, to a system and method for transmitting downlink reference signals in a multi-user multiple input multiple output system.

BACKGROUND OF THE INVENTION

Modern communications demand higher data rates and performance. Multiple-input multiple-output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas.

The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

Additionally, a downlink physical signal corresponds to a set of resource elements used by the physical layer but does not carry information originating from higher layers. The following downlink physical signals are defined: Synchronization signal and Reference signal.

The reference signal consists of known symbols transmitted at a well defined OFDM symbol position in the slot.

This assists the receiver at the user terminal in estimating the channel impulse response to compensate for channel distortion in the received signal. There is one reference signal transmitted per downlink antenna port and an exclusive symbol position is assigned for an antenna port (when one antenna port transmits a reference signal other ports are silent). Reference signals (RS) are used to determine the impulse response of the underlying physical channels.

SUMMARY OF THE INVENTION

A base station capable of communicating with a plurality of subscriber stations is provided. The base station includes a plurality of antenna configured to transmit control information.

The base station also includes a transmitter coupled to the plurality of antenna. The transmitter is configured to transmit a resource block to a first subscriber station. The resource block includes at least two downlink reference signal (DRS) patterns. The base station further includes a controller configured to assign a first DRS pattern for use by the first subscriber station. The controller is configured to reserve a state in a downlink grant.

The reserved state is configured to inform the first scriber station regarding the assignment of first DRS pattern.

A subscriber station capable of communicating with a plurality of base stations in a multi-user multiple-input multiple-output (MIMO) wireless network is provided. The subscriber station includes a plurality of antenna configured to receive control information. The subscriber station also includes a receiver coupled to the plurality of antenna. The receiver is configured to receive a resource block from a first base station. The resource block includes at least two downlink reference signal (DRS) patterns. The subscriber station further includes a controller configured identify a reserved state in a downlink grant. The reserved state is configured to indicate an assignment of a first DRS pattern. The controller is configured to read the first DRS pattern as a pilot resource element.

A method for operating a base station is provided. The method includes assigning a first DRS pattern for use by a first subscriber station. The method also includes reserving a state in a downlink grant. The reserved state is configured to inform the first scriber station regarding the assignment of a first DRS pattern. Further, the method includes transmitting a resource block to the first subscriber station. The resource block includes at least two downlink reference signal (DRS) patterns.

A base station capable of performing a coordinated multipoint transmission to a plurality of subscriber stations is provided. The base station includes a plurality of antenna configured to transmit data and control information. The plurality of antenna is coupled to a transmitter. The transmitter is configured to transmit a plurality of symbols in a sub-frame. The base station also includes a controller configured to synchronize the transmission of the plurality of symbols based on a physical control format indicator of a second base station.

A subscriber station capable of receiving a coordinated multipoint transmission from a plurality of base stations is provided. The subscriber station includes a plurality of antenna configured to receive data and control information. The subscriber station also includes a receiver coupled to the plurality of antenna. The receiver is configured to receive a plurality of symbols in a sub-frame. A physical downlink shared channel (PDSCH) transmission from a first base station is synchronized with a PDSCH from a second base station such that the transmission of the plurality of symbols from the first base station is based on a physical control format indicator of a second base station.

A method for operating a base station capable of performing a coordinated multipoint transmission to a plurality of subscriber stations is provided. The method includes transmitting a plurality of symbols in a sub-frame. The method also includes synchronizing, by a controller, the transmission of the plurality of symbols based on a physical control format indicator of a second base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrate a resource blocks according to embodiments of the present disclosure;

FIGS. 7A and 7B illustrate perspective views of the resource block according to embodiments of the present disclosure;

FIG. 14 illustrates physical control format indicator channels (PCFICH) for two cells of a joint transmission according to embodiments of the present disclosure;

FIGS. 15 through 20 illustrate physical downlink shared channel (PDSCH) regions according to embodiments of the present disclosure.

DETAILED DESCRIPTION OF THE INVENTION

FIGS. 1A through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Further, the term "cell" is a logic concept that can represent a "base station" or a "sector" belongs to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" used below.

Figure 1A:
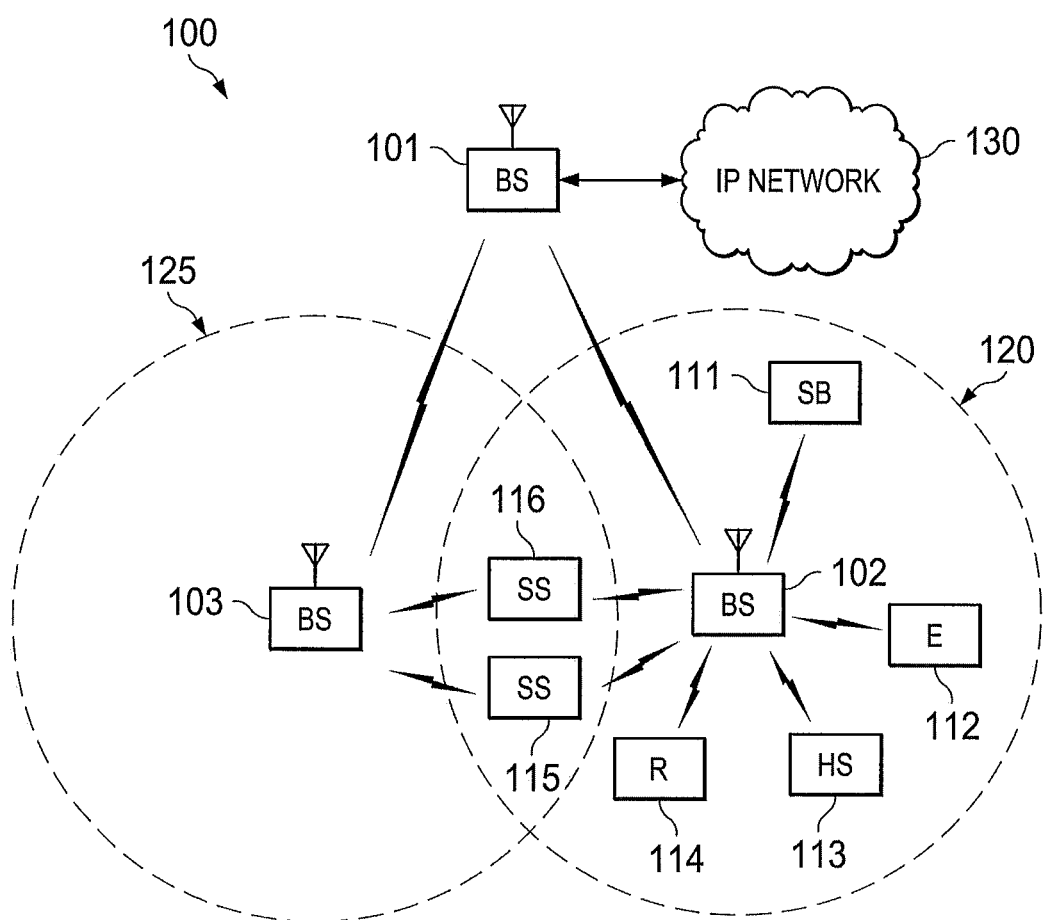
FIG. 1A illustrates an exemplary wireless network that is capable of decoding data streams according to embodiments of the disclosure.

FIG. 1A illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile device, and SS 116 may be a mobile device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations.

Furthermore, while only six subscriber stations are shown in FIG. 1A, it is understood that wireless network 100 may provide wireless broadband access to more than six subscriber stations. It is noted that subscriber station 115 and subscriber station 116 are on the edge of both coverage area 120 and coverage area 125.

Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café hotel, or college campus. Base station 102 may provide digital subscriber line (DSL) level service to subscriber stations 114, 115 and 116.

Subscriber stations 111-116 may use the broadband access to network 130 to access voice, data, video, video, teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1A, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1A. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 1B:
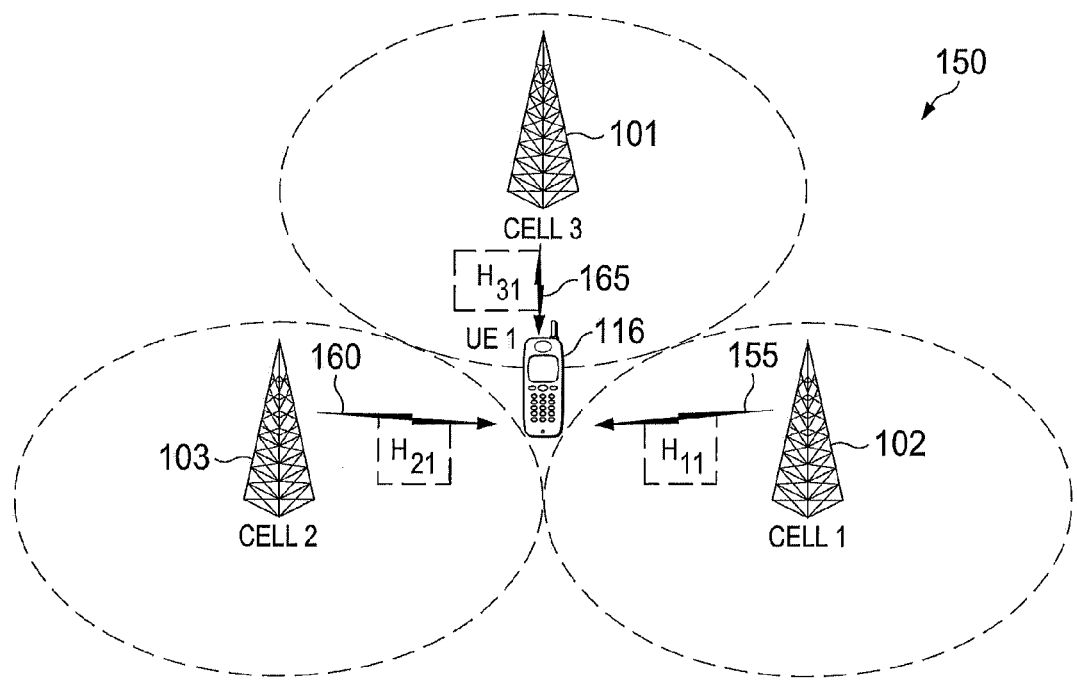
FIG. 1B illustrates a coordinated multi-point (CoMP) transmission according to embodiments of the present disclosure.

FIG. 1B illustrates a coordinated multi-point (COMP) transmission according to embodiments of the present disclosure. The embodiment of the coordinated multi-point transmission 150 shown in FIG. 1B is for illustration only. Other embodiments of the coordinated multi-point transmission 150 could be used without departing from the scope of this disclosure.

In single point transmission each UE, such as SS 116, receives a transmission from one base station, such as BS 102. In the coordinated multi-point transmission 150, SS 116 receives the same data from more than one base station, such as from BS 102, BS 103 and BS 101. Each base station, e.g., BS 102, BS 103 and BS 101, in a joint transmission, sends information to SS 116 using the same frequency band. SS 116 substantially simultaneously receives the data transmissions from the BS 102, BS 103 and BS 101. SS 116 is able to combine the three transmissions and retrieve the data. This multi-cell version of single-user MIMO system is performed for SS 116 (e.g., a cell-edge UE) where the received signal to interference plus noise ratio is small. As a result of this joint processing, the received signals at SS 116 will be coherently or non-coherently added up together.

In FIG. 1B, BS 102 (e.g., "Cell 1") is the actual serving cell for SS 116. BS 103 (e.g., "Cell 2") and BS 101 (e.g., "Cell 3") are strong interference cells to SS 116. $H_{i1}$ corresponds to the wireless channel from "Cell i" to SS 116. Accordingly, $H_{11}$ 155 corresponds to the wireless channel from BS 102 to SS 116; $H_{21}$ 160 corresponds to the wireless channel from BS 103 to SS 116; and $H_{31}$ 165 corresponds to the wireless channel from BS 101 to SS 116. When in the joint processing mode, BS 102, BS 103 and BS 101 jointly process SS 116's information together. BS 102, BS 103 and BS 101 send SS 116's information over the air to SS 116 simultaneously through the wireless channels. By doing this, the interference is greatly reduced while the received power (sum from the three cells BS 102, BS 103 and BS 101) is greatly improved.

SS 116 receives PDCCH from a single cell, BS 102 (also referred to as the anchor cell). Depending on the CoMP scheme, SS 116 may or may not be aware from which cells ("active CoMP set") SS 116 is receiving the Physical Downlink Shared Channel (PDCCH) transmission. Therefore the Physical Control. Format Indicator Channel (PCFICH) of different cells within the active CoMP set may be different.

Figure 2:
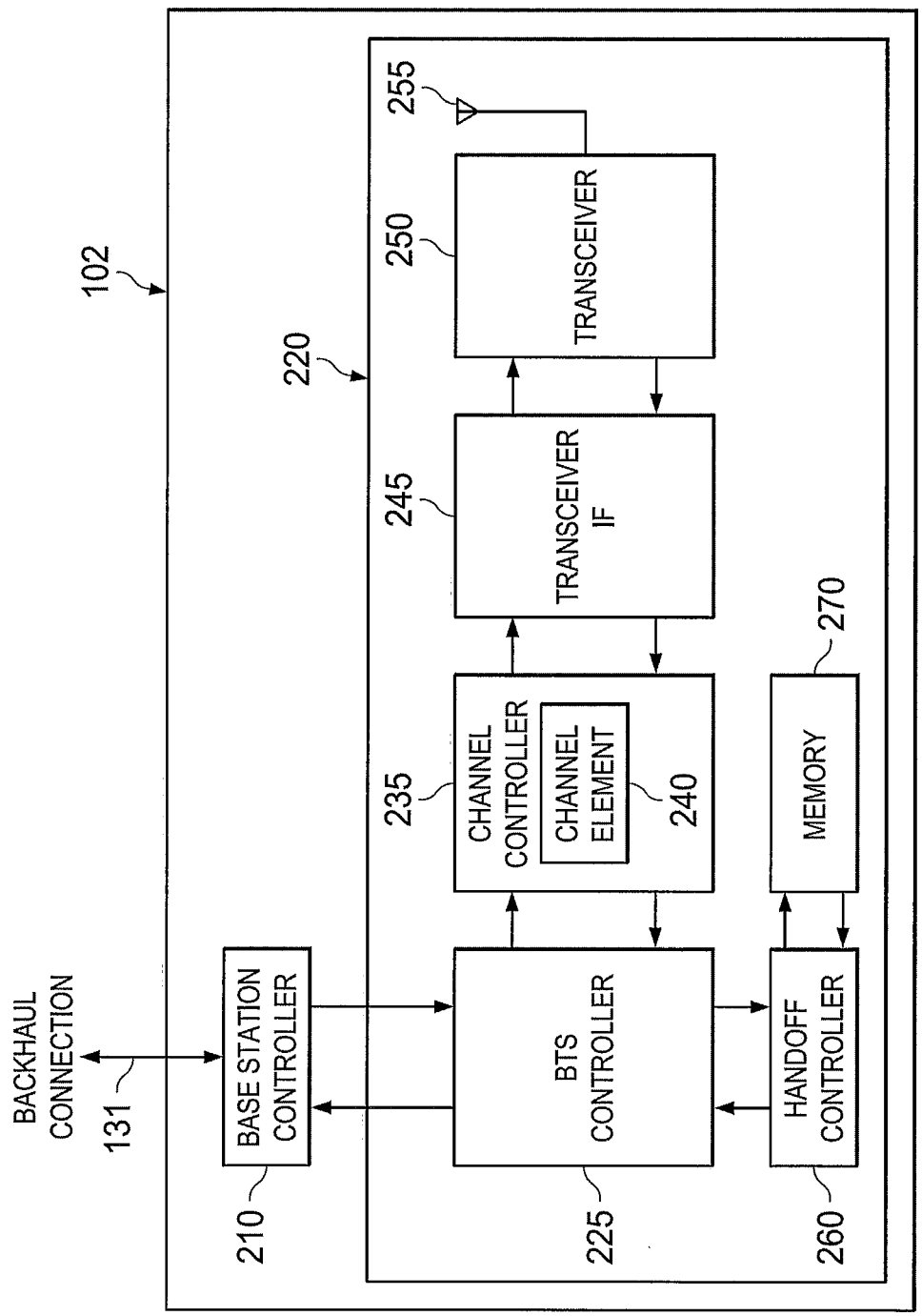
FIG. 2 illustrates an exemplary base station in greater detail according to one embodiment of the present disclosure.

FIG. 2 illustrates an exemplary base station in greater detail according to one embodiment of the present disclosure. The embodiment of base station 102 illustrated in FIG. 2 is for illustration only. Other embodiments of the base station 102 could be used without departing from the scope of this disclosure.

Base station 102 comprises base station controller (BSC) 210 and base transceiver subsystem (BTS) 220. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an advantageous embodiment of the present disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of the present disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of the present disclosure, BTS controller 225 is operable to store threshold parameters and in a memory 270. Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

BSC 210 is operable to maintain communications between BS 102 and BS 101 and BS 103. BS 102 communicates to BS 101 and BS 103 via the wireless connection 131. In some embodiments, the wireless connection 131 is wire-line connection.

Figure 3:
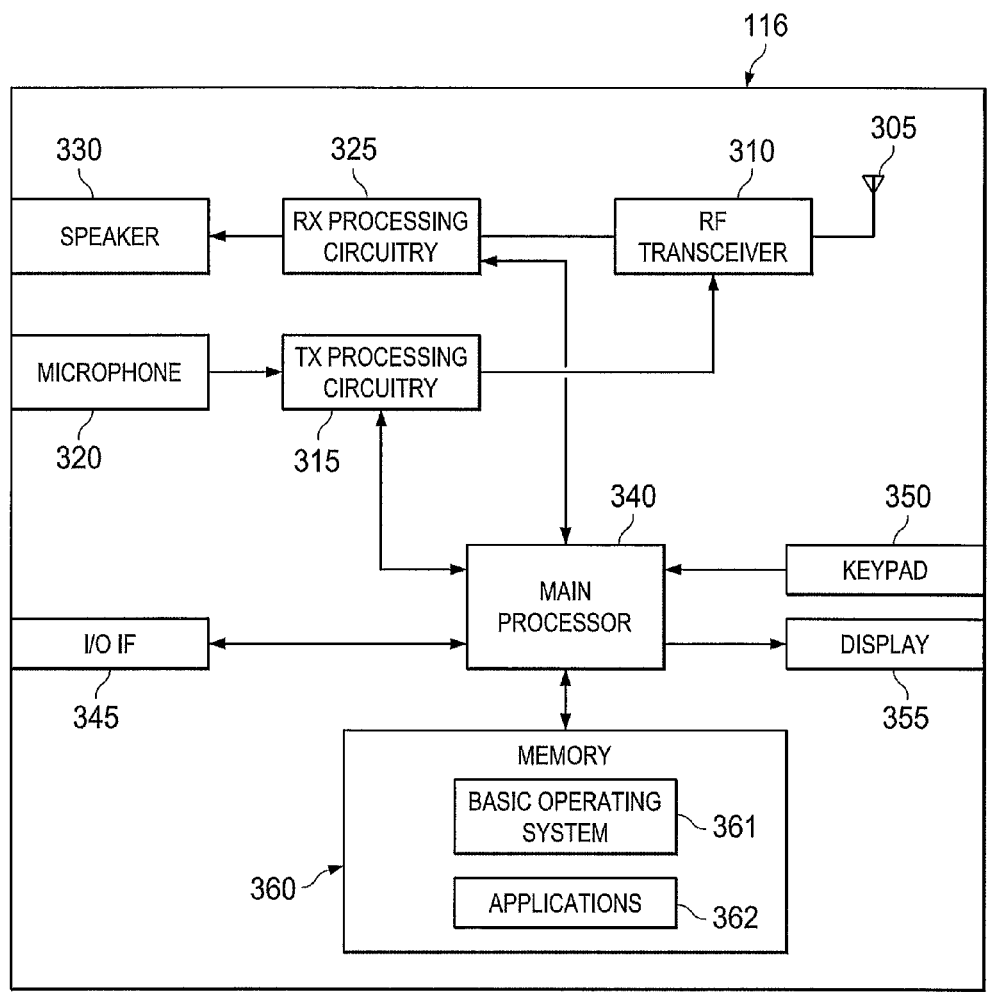
FIG. 3 illustrates an exemplary wireless subscriber station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for CoMP communications and MU-MIMO communications. Main processor 340 can move data into or out of memory 360, as required by an executing process. In some embodiments, the main processor 340 is configured to execute a plurality of applications 362, such as applications for CoMP communications and MU-MIMO communications.

The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Figure 4:
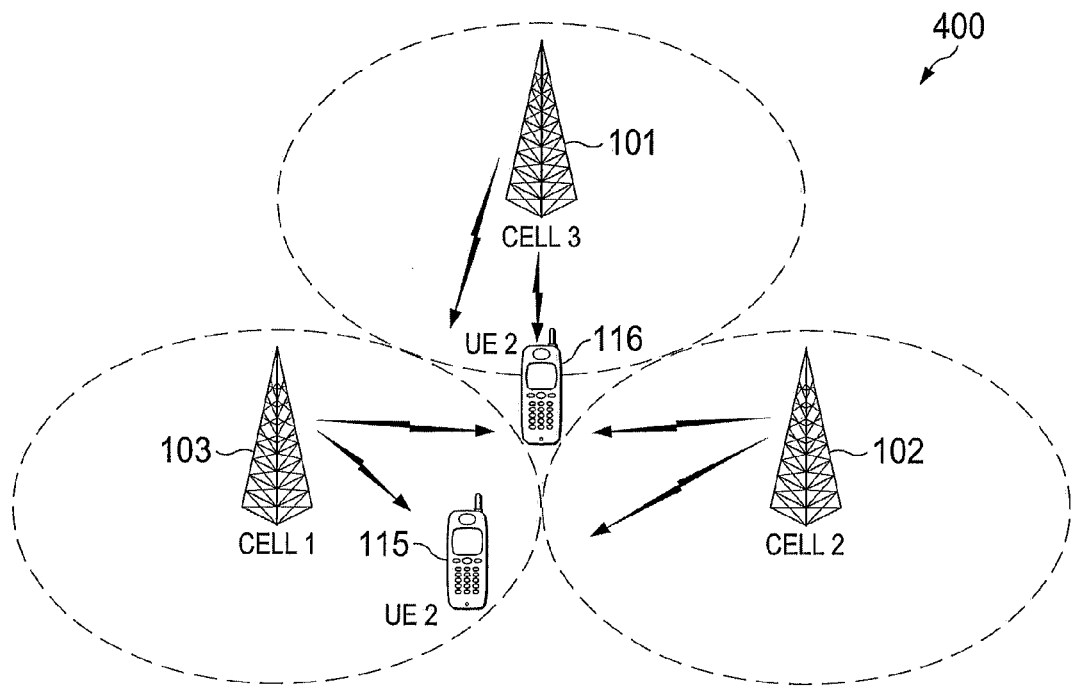
FIG. 4 illustrate a CoMP transmission with multi-user multiple-input multiple-output (MU-MIMO) according to embodiments of the present disclosure.

FIG. 4 illustrate a CoMP transmission with MU-MIMO according to embodiments of the present disclosure. The embodiment shown in FIG. 4 is for illustration only. Other embodiments could be used without departing from the scope of this disclosure.

BS 102 is configured to operate a DRS-based MU-MIMO mode 400 wherein BS 102 can use a dedicated UE-specific reference signal (RS), also referred to as a downlink reference signal (DRS) or demodulation reference signal (DMRS), to communicate with SS 116. Accordingly, BS 102 precodes the data and DRS with the same set of precoding vectors or matrices. Additionally, SS 116 is configured to receive the data and DRS as precoded by BS 102. Furthermore, this DRS based MU-MIMO mode 400 operation can be applicable to both single-cell transmission and multi-cell CoMP transmissions. For example, in the single-cell transmission, SS 116 receives PDSCH data from BS 102 only. However, in multi-cell CoMP transmission, SS 116 receives PDSCH data from the anchor cell, BS 102, and other serving cells, such as BS 101 and BS 103. Further, in the multi-cell CoMP transmission, BS 101, BS 102 and BS 103 coordinate to simultaneously transmit to SS 116 and SS 115 using overlapping time and frequency resources.

In some embodiments, each UE, such as SS 116 and SS 115, is configured according to the DRS-based MU-MIMO mode 400 to receive a single-layer data transmission. For example, SS 116 is configured to receive a single layer transmission that includes one set of DRS wherein, BS 102 precodes the single-layer data and the DRS with the same precoding vector. BS 102 can reserve a state configured to inform SS 116 regarding the DRS-based MU-MIMO 400 transmission. For example, the state can be included in the Downlink Control Information (DCI) grant, such as, a new field within the DCI grant or a number of code points.

Figure 5A:
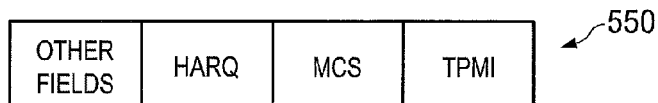
FIGS. 5A and 5B illustrate DCI grant formats according to embodiments of the present disclosure.
Figure 5B:
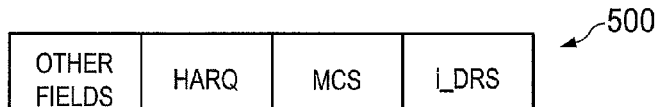

FIGS. 5A and 5B illustrate DCI grant formats according to embodiments of the present disclosure. The embodiments shown in FIGS. 5A and 5B are for illustration only and other embodiments could be used without departing from the scope of this disclosure.

In some embodiments, the reserved state is a new field within the DCI. For example, to facilitate the DRS-based MU-MIMO with single-layer data transmission, BS 102 is configured to use a new DCI format 500. The new DCI format 500 is configured to support single-layer transmission with DRS. The new DCI format 500 differs from a previous DCI format 1D 550 in 3GPP TS 36.212 v 8.5.0, "E-UTRA, Multiplexing and Channel coding", December 2008, the contents of which hereby are incorporated by reference in its entirety. First, the new DCI format 500 does not include the TPMI field 555. Additionally, the new DCI format 500 includes the state information included as an index field (i_DRS) 505. The i_DRS 505 indicates which one of the DRS in the system is used for SS 116. The bit-width of the i_DRS 505 field depends upon the maximum number of DRSs allowed in MU-MIMO. This maximum allowed DRS number, denoted by M, is either fixed in the standard or signaled by BS 102 as a cell-specific value in broadcast channel. M can be set by BS 102 and can be equal to the number of antenna included in BS 102. The bit-width of i_DRS 505 can be defined by Equation 1:

$$BW_{i\_DRS} = \lceil Log_2 M \rceil \qquad \text{[Eqn. 1]}$$

FIGS. 6A and 6B illustrate a resource block according to embodiments of the present disclosure. The embodiment of the resource blocks 600, 650 shown in FIGS. 6A and 6B respectively are for illustration only. Other embodiments could be used without departing from the scope of this disclosure.

FIG. 6A illustrates a resource block for a Frequency Division Multiplexing (FDM). The FDM resource block 600 includes a number of Common Resource Signals (CRS). For example, the resource block 600 includes CRS 605 for port '0' and CRS 610 for port '1'. Furthermore, the resource block 600 includes a number of DRS's according to a DRS pattern defined in the system. For example, when M=2, that is, two DRS patterns are specified in the system, the resource block 600 includes a DRS(1) 615 and a DRS(2) 620.

The CRS is allocated across the bandwidth for use by a number of subscriber stations. The DRS, however, can be UE specific and allocated for each subscriber station respectively. Additionally, when M=2, BS 102 can use the resource block 600 to communicate with one or two subscriber stations, such as SS 116 and SS 115. The resource block 600 can include two DRS patterns 605, 610 for use by the two subscriber stations. For example, BS 102 can allocate DRS(1) 615 for SS 116 and DRS(2) 620 for SS 115.

BS 102 can inform SS 116 which DRS has been allocated to SS 116 by reserving a state in the downlink grant, such as by including the i_DRS field 505 in the DCI 500 grant or via code points. BS 102 can also inform SS 116 that there are more than one DRS's in the resource block 600. For example, BS 102 can inform SS 116 that there are two (e.g., M=2) DRS patterns in the resource block 600.

Thereafter, SS 116 can identify that the DRS(1) 615 pattern is to be used by SS 116 and that the DRS(2) 620 pattern is to be avoided (e.g., ignored). Additionally, BS 102 is communicating with a second subscriber station, such as SS 115, the second subscriber station can identify that the DRS(2) 620 pattern is to be used by the second subscriber station (e.g., SS 115 identifies that the DRS(2) 620 pattern is allocated to itself) and that the DRS(1) 615 pattern is to be avoided.

Additionally, embodiments of the present disclosure are applicable to both Code Division Multiplexing (CDM) and FDM Reference Symbol (RS) patterns. As shown by the CDM resource block 650 illustrated in FIG. 6B, the DRS pattern can refer to the location of the RS for a given antenna port and/or the Walsh code used for the RS of a given antenna port. For example, a first RS set 655 can include a Walsh code [1 1] for layer 1 and a Walsh code [1 -1] for layer 2. Additionally, a second RS set 660 can include a Walsh code [1 1] for layer 3 and a Walsh code [1 -1] for layer 4.

Figure 7B:
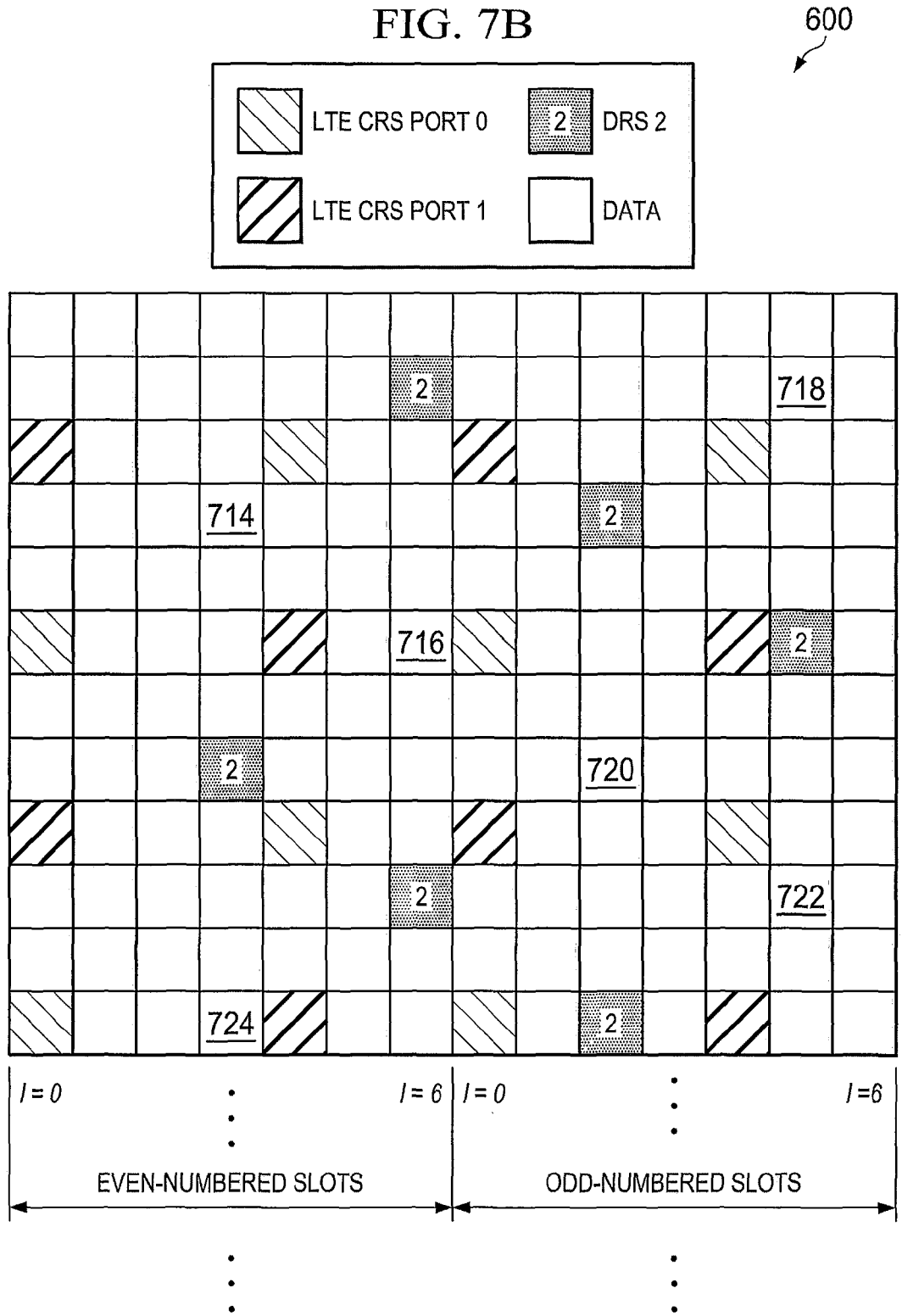

FIGS. 7A and 7B illustrate perspective views of the resource block 600 according to embodiments of the present disclosure. The embodiments of the resource block 600 shown in FIGS. 7A and 7B are for illustration only. Other embodiments could be used without departing from the scope of this disclosure.

In some embodiments, BS 102 can inform SS 116 that two DRS patterns exist regardless of the number of subscriber stations to which BS 102 actually is communicating. For example, BS 102 may be communicating only with SS 116, that is, BS 102 is not communicating with SS 115 (or any other subscriber station, such as, SS 111-SS 114). BS 102 can inform SS 116 that two DRS patterns exist in the resource block 600.

The subscriber stations, such as SS 116 and SS 115, read the entire resource block 600, that is, the subscriber stations do not ignore the DRS pattern that is not assigned to the subscriber station. For example, FIG. 7A shows a perspective of the resource block 600 as viewed by SS 116. BS 102 informs SS 116 that the DRS(1) 615 pattern is to be used by SS 116. BS 102 can also inform SS 116 that two DRS patterns are included in the resource block 600 even though BS 102 may only be communicating with one subscriber station. SS 116, therefore, can read the resource block 600 as if only DRS(1) 615 exists in the resource block 600. Accordingly, SS 116 sees DRS(1) 615 as a pilot resource element (RE) and other REs (other than CRS 605, 610 and DRS(1) 615) as data REs. That is, SS 116 attempts to read, as data, from REs 702, 704, 706, 708, 710, 712.

In an additional example, FIG. 7B shows a perspective of the resource block 600 as viewed by SS 115. BS 102 informs SS 115 that the DRS(2) 620 pattern is to be used by SS 115. BS 102 can also inform SS 115 that two DRS patterns are included in the resource block 600 even though BS 102 may only be communicating with one subscriber station. Therefore, SS 115 can read the resource block 500 as if only DRS(2) 620 exists in the resource block 600. Accordingly, SS 115 sees DRS(2) 620 as a pilot RE and other REs (other than CRS 605, 610 and DRS(2) 620) as data REs. That is, SS 116 attempts to read, as data, from REs 714, 716, 718, 720, 722, 724.

Figure 8:
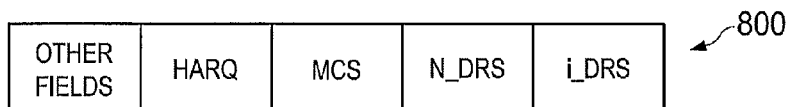
FIG. 8 illustrates a DCI grant format according to embodiments of the present disclosure.

FIG. 8 illustrates a DCI grant format according to embodiments of the present disclosure. The embodiment shown in FIG. 8 is for illustration only and other embodiments could be used without departing from the scope of this disclosure.

In some embodiments, BS 102 also informs SS 116 regarding the number of subscriber stations to which a DRS is assigned. BS 102 can reserve an additional state, such as another field in the DCI grant or code points, to inform SS 116 as to the number of subscriber stations to which a DRS is assigned.

For example, BS 102 can transmit a DCI format 1F 800 as shown in FIG. 8. The DCI format 1F 800 includes the i_DRS 505 field as well as an N_DRS 805 field. The N_DRS field includes an indicator adapted to indicate the number "N" number of DRSs in the scheduled band; this includes the DRS used for SS 116 and other subscriber stations, such as SS 115, scheduled in the same band in this particular sub-frame. The bit-width of this field can also be defined according to Equation 1 (e.g., $\lceil Log_2 M \rceil$). The value range of N_DRS is $1 \leq N\_DRS \leq M$. That is, N can be equal to the number of DRS patterns included in the resource block 600.

Therefore, SS 116 can be informed, by BS 102, that SS 116 is to use the DRS(1) 615 pattern and avoid the DRS(2) 620 pattern. However, if more than two DRS patterns exist in the resource block 600 (that is, M>2), SS 116 does not avoid the additional DRS patterns; rather SS 116 attempts to read the other REs as data REs. For example, if M=8 and N=2, SS 116 sees the assigned DRS, such as DRS(1) 615, as a pilot resource element (RE), avoids the DRS, such as DRS(2) 620, assigned to another subscriber station, such SS 115, and the other REs (other than CRS 605, 610, DRS(1) 615 and DRS(2) 620) as data REs.

Figure 9A:
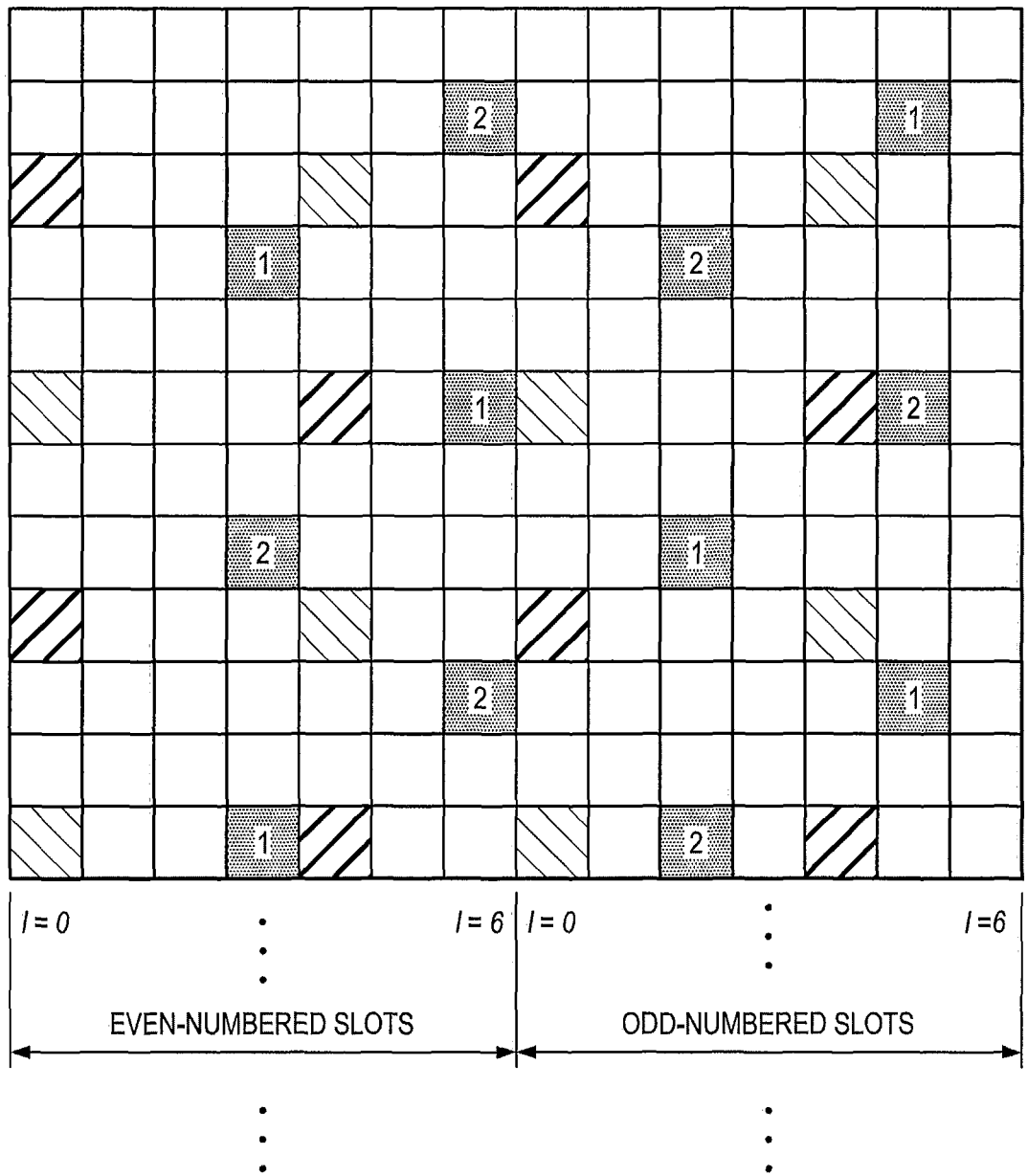
FIGS. 9A and 9B illustrate additional perspective views of the resource block 600 according to embodiments of the present disclosure.
Figure 9B:
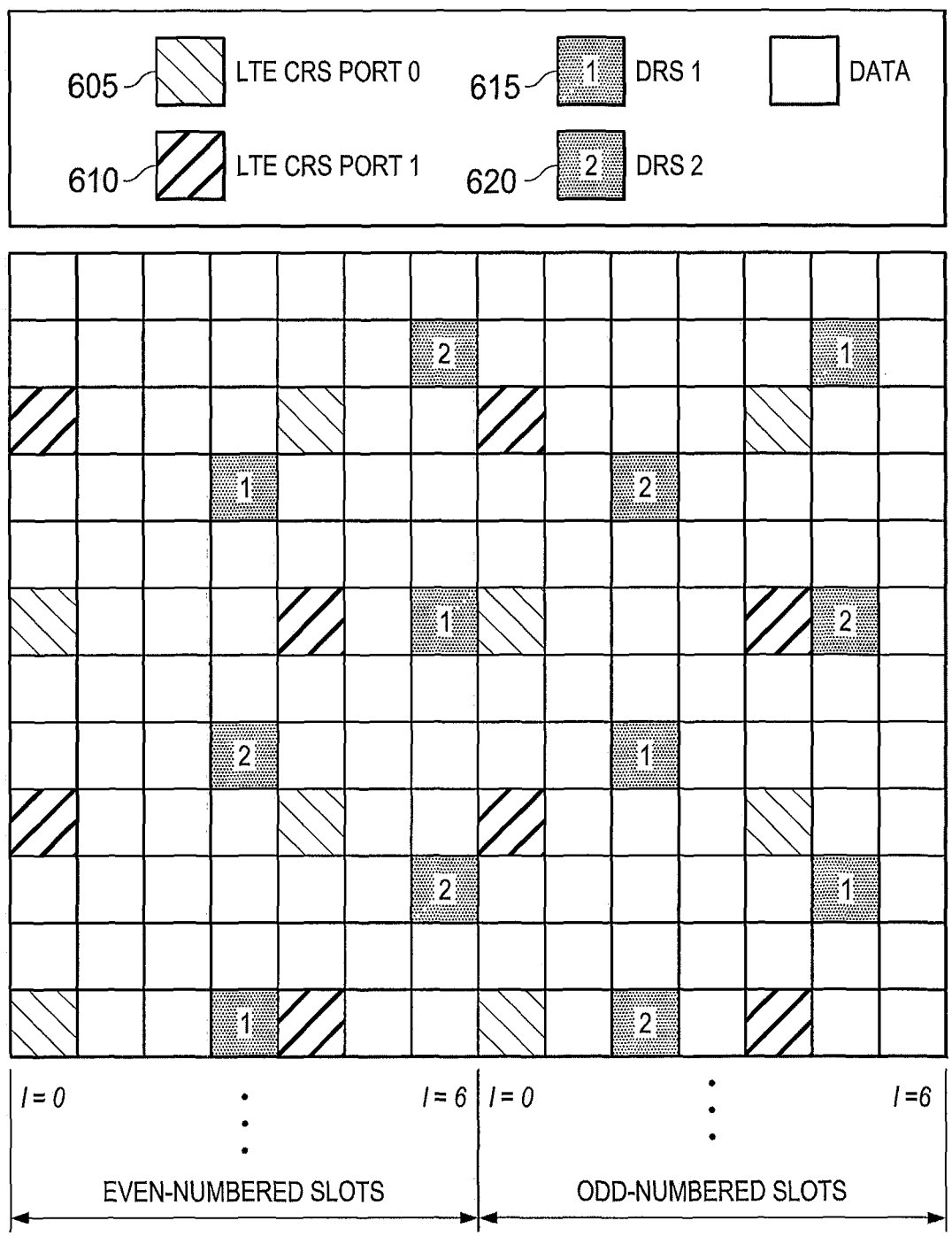

FIGS. 9A and 9B illustrate additional perspective views of the resource block 600 according to embodiments of the present disclosure. The embodiments of the resource block 600 shown in FIGS. 9A and 9B are for illustration only. Other embodiments could be used without departing from the scope of this disclosure.

In the example illustrated in FIGS. 9A and 9B, the subscriber stations, such as SS 116 and SS 115, read the resource block 600 based on the DCI format 1F 800. For example, FIG. 9A shows a perspective of the resource block 600 as viewed by SS 116. BS 102 informs SS 116 that the DRS(1) 615 pattern is to be used by SS 116. BS 102 can also inform SS 116 that two DRS patterns are included (e.g., M=2) in the resource block 600 and that BS 102 is communicating with two subscribers stations (e.g., N=2). It will be understood that illustration of the values of N=2 and M=2 are used for example purposes only and the values can be different and unequal where $1 \leq N \leq M$ and $1 \leq M \leq$ (# of antennas included in BS 102). Once SS 116 receives N_DRS and i_DRS, SS 116 expects that the set of DRSs {DRS(1) 615, DRS(2) 620, ... DRS (N_DRS)} is used for transmitting data to multiple users in this sub-frame. Additionally, SS 116 expects DRS(i_DRS), such as DRS(1) 615, is used as reference signal to demodulate its own data. Accordingly, SS 116 sees DRS(1) 615 as a pilot RE, avoids DRS(2) 620 as a pilot RE assigned to another subscriber station (SS 115), and other REs (other than CRS 605, 610, DRS(1) 615 and DRS(2) 620) as data REs.

In an additional example, FIG. 9B shows a perspective of the resource block 600 as viewed by SS 115. BS 102 informs SS 115 that the DRS(2) 620 pattern is to be used by SS 115. BS 102 can also inform SS 115 that two DRS patterns are included (e.g., M=2) in the resource block 600 and that BS 102 is communicating with two subscribers stations (e.g., N=2). Once SS 115 receives N_DRS and i_DRS, SS 115 expects that the set of DRSs {DRS(1) 615, DRS(2) 620, DRS (N_DRS)} is used for transmitting data to multiple users in this sub-frame. Additionally, SS 115 expects DRS(i_DRS), such as DRS(2) 620, is to be used as reference signal to demodulate its own data. Accordingly, SS 115 sees DRS(2) 620 as a pilot RE, avoids DRS(1) 615 as a pilot RE assigned to another subscriber station (SS 116), and other REs (other than CRS 605, 610, DRS(1) 615 and DRS(2) 620) as data REs.

SS 116 assumes the DRS RE indicated by i_DRS is precoded using the same precoding vector as the data layer, and therefore is used as demodulation pilot for the data layer. Additionally, in terms of avoiding a DRS RE in the data to RE mapping step of an eNB transmission, several alternatives exist.

In a first alternative, BS 102 transmits data on RE(s) other than the sets of DRS RE indicated by the set {DRS(1) 615, ..., DRS(N_DRS)}. At the subscriber station side, SS 116 assumes the eNB data is mapped to the RE other than the set of DRS RE indicated by the set {DRS (1) 615, ... DRS (N_DRS)}.

In a second alternative, similar to the case in DCI format 1D 550, BS 102 transmits data on RE(s) other than the set of DRS RE indicated by the index i_DRS. At the subscriber station side, SS 116 will assume the eNB data is mapped to the RE other than the set of DRS RE indicated by the index i_DRS.

In a third alternative, SS 116 receives a cell-specific or UE-specific switch configured by the eNB using higher layers, denoted by DRS_region_switch. For example, if DRS_region_switch=0, then SS 116 assumes BS 102 data is mapped to the RE other than the set of DRS RE indicated by the set {DRS(1), ... DRS (N_DRS)}. Additionally, if DRS_region_switch=1, then SS 116 assumes BS 102 data is mapped to the RE other than the set of DRS RE indicated by the index DRS{i_DRS}.

In some embodiments, each subscriber station is configured in this new DRS-based MU-MIMO mode (both single cell and COMP) to receive one or more layer data transmissions. For example SS 116, configured in this mode, expects one or more layer transmission together with a set of DRSs, and expects BS 102 to precode each data layer and its corresponding DRS RE with the same precoding vector.

Figure 10:
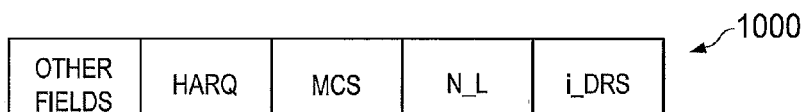
FIGS. 10 through 13 illustrate a DCI grant formats according to embodiments of the present disclosure.

FIG. 10 illustrates a DCI grant format according to embodiments of the present disclosure. The embodiment shown in FIG. 10 is for illustration only and other embodiments could be used without departing from the scope of this disclosure.

In some embodiments, BS 102 also informs SS 116 regarding the number of layers that are used for data transmission. BS 102 can reserve an additional state, such as another field in the DCI grant or code points, to inform SS 116 as to the number of layers that are used for data transmission.

For example, BS 102 can transmit a DCI format 1G 1000 as shown in FIG. 10. The DCI grant format 1G 1000 includes the i_DRS 505 field as well as an N_L 1005 field. The N_L field 1005 includes an indicator adapted to indicate the number "L" of layers in the transmission to SS 116. Accordingly, in the DCI format 1G 1000, BS 102 can convey the following information: (1) how many layers are used for data transmission; and (2) what are the corresponding DRSs for these layers.

When BS 102 uses the DCI format 1G 1000 as a SA for MU-MIMO transmission, in the data to RE mapping step, BS 102 transmits data on RE(S) other than the set of DRS RE indicated by the set of consecutive DRS patterns {DRS (i_DRS), . . . , DRS(i_DRS+N_L−1)}. At the subscriber station side, SS 116 will assume the set of RE indicated by DRS(i_DRS) is precoded using the same precoding vector as the data layer #1, and therefore is used as demodulation pilot for data layer #1. Similarly, SS 116 uses DRS(i_DRS+1) to demodulate layer #2, and, DRS(i_DRS+N_L−1) is used to demodulate layer #N_L. SS 116 also assumes BS 102 data is mapped to the RE other than the set of DRS RE indicated by the index {DRS(i_DRS), . . . DRS(i_DRS+N_L−1)}.

Figure 11:
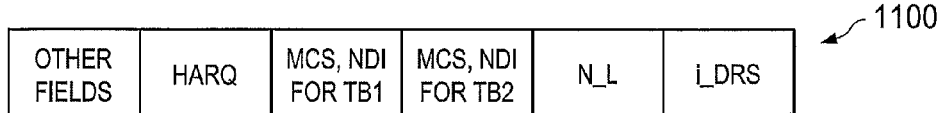

As a variation of DCI format 1G 1000, if up to two codewords are used in the MU-MIMO, BS 102 can use DCI format 2G 1100, illustrated in FIG. 11. DCI format 2G 1100 includes the N_L field 1005 and the i_DRS field 505. However, DCI format 2G 1100 includes two sets of MCS, DCI fields, 1105, 1110, each corresponding to a given TB (transport block).

In some embodiments, a code division multiplexing (CDM) is utilized. BS 102 can implicitly inform SS 116 which DRS pattern to utilize. Further, BS 102 does not include i_DRS 505 in the grant. SS 116 can determine, implicitly, which REs are pilot REs and which are data. For example, when N_L=1, SS 116 can use the DRS(1) 615 pattern. Additionally, when NL-2, SS 116 can use DRS(1) 615 and DRS(2) 620 as the DRS pattern.

Figure 12:
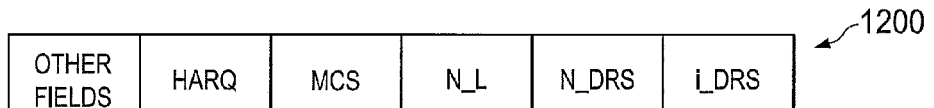

FIG. 12 illustrates a DCI grant format according to embodiments of the present disclosure. The embodiment shown in FIG. 12 is for illustration only and other embodiments could be used without departing from the scope of this disclosure.

In DCI format 1H 1200, one codeword transmission occurs from BS 102 to SS 116, regardless of number of layers used in the transmission. Compared to DCI format 1G 100, DCI format 1H 1200 includes the additional field N_DRS 805. The N_DRS field 805 indicates the total number of DRSs in the scheduled band.

When BS 102 uses the DCI format 1H 1200 as SA for MU-MIMO transmission, SS 116 assumes the set of RE indicate by DRS(i_DRS) is precoded using the same precoding vector as the data layer #1, and therefore is used as demodulation pilot for data layer #1. Similarly, SS 116 uses DRS(i_DRS+1) to demodulate layer #2, . . . , and DRS (i_DRS+N_L−1) to demodulate layer #N_L. Additionally, in terms of avoiding DRS RE in the data-to-RE mapping step of eNB transmission, several alternatives exist.

BS 102 transmits data on RE(s) other than the sets of DRS RE indicated by the set {DRS(1) 615, . . . , DRS(N_DRS)}. At the subscriber station side, SS 116 assumes BS 102 data is mapped to the RE other than the set of DRS RE indicated by the set {DRS(1), . . . DRS (N_DRS)}.

Similar to the case in DCI format 1G 1000, BS 102 transmits data on RE(s) other than the set of DRS RE indicated by the set {DRS(i_DRS), DRS(i_DRS+N_L)}. At the subscriber station side, SS 116 assumes BS 102 data is mapped to the RE other than the set of DRS RE indicated by the set {DRS (i_DRS), . . . , DRS(i_DRS+N_L−1)}.

In this alternative SS 116 can receive a cell-specific or UE-specific switch configured by BS 102 using higher layers and denoted by DRS_region_switch. If DRS_region_switch=0, then SS 116 assumes BS 102 data is mapped to the RE other than the set of DRS RE indicated by the set {DRS(1) 615, . . . DRS(N_DRS)}. Alternatively, if DRS_region_switch=1, then SS 116 assumes BS 102 data is mapped to the RE other than the set of DRS RE indicated by the index set {DRS(i_DRS), DRS(i_DRS+N_L−1)}.

Figure 13:
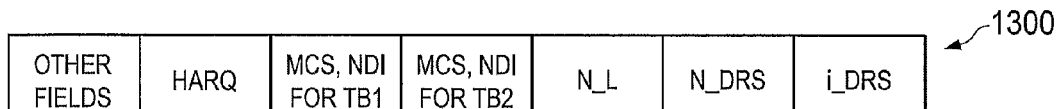

As a variation of DCI format 1H 1200, if up to two codewords are used in the MU-MIMO, BS 102 can utilize a DCI format 2H 1300 illustrated in FIG. 13. The DCI format 2H 1300 includes the N_L field 1005, N_DRS field 805 and i_DRS field 505. However, DCI format 2H 1300 includes two sets of MCS, DCI fields, 1305, 1310 each corresponding to a given TB (transport block).

In some embodiments, the transmitting cells, such as BS 102 and BS 103, can perform the CoMP joint transmission using the same scrambling sequence for the PDSCHs. The actual transmitting cells are defined as the cells within the serving cell cluster that participate in current CoMP joint transmission. Note that in CoMP joint transmission, SS 116 is expected to receive PDSCHs from all the serving cells in the same time-frequency grid so that the signals can be superposed over the air.

For example, the UE under CoMP joint transmission, such as SS 116, is expecting that the PDSCHs from the actual transmitting cells of CoMP joint transmission, such as BS 102 and BS 103, are scrambled using the scramble sequence generated by the parameters of the anchor cell, that is BS 102. The anchor cell is defined as the cell, such as BS 102, that transmits PDCCH to SS 116 concerning control information about the CoMP joint transmission. Specifically, for each code word q, the block of bits $b^{(q)}(0), \ldots, b^{(q)}(M_{bit}^{(q)}-1)$, where $M_{bit}^{(q)}$ is the number of bits in code word q transmitted on the physical channel in one sub-frame, is scrambled prior to modulation, resulting in a block of scrambled bits $\tilde{b}^{(q)}(0), \ldots, \tilde{b}^{(q)}(M_{bit}^{(q)}-1)$ according to Equation 2:

$$\tilde{b}^{(q)}(i)=(b^q(i)+c^q(i)) \bmod 2 \qquad \text{[Eqn. 2]}$$

In Equation 2, the scrambling sequence is $c^q(i)$. The scrambling sequence generator is initialized at the start of each sub-frame, where the initialization value of $C_{init}$ is defined by Equation 3:

$$c_{init}=n_{RNTI} \cdot 2^{14}+q \cdot 2^{13}+\lfloor n_s/2 \rfloor \cdot 2^9+N_{ID}^{Anchor\ Cell} \qquad \text{[Eqn. 4]}$$

In Equation 4, $n_{RNTI}$ corresponds to the RNTI associated with the PDSCH transmission and $N_{ID}^{Anchor\ Cell}$ is the cell ID of anchor cell, that is, BS 102. From the eNB side, the cells participating in the CoMP joint transmission, that is, BS 102 and BS 103, scramble the PDSCHs from different cells using the same scrambling sequence based on the parameters of the cell that sends PDCCH concerning CoMP joint transmission to the SS 116.

In the CoMP joint transmission, BS 102 and BS 03 each include a different number of OFDM symbols used for transmission of PDCCHs in a sub-frame (control region). As discussed, it is important to have the same data region across the all the actual transmitting cells in the CoMP joint transmission mode. Current system will have PCFICH (physical control format indicator channel) to indicate the size of the control region. Since PDCCH of the CoMP joint transmission is transmitted only through the anchor cell, therefore, PCFICHs of different cells in the actual transmitting cell set can be different, as illustrated in FIG. 14. For example, PCFICH 1405 of BS 102 can be different the PCFICH 1410 of BS 103.

FIGS. 15 through 20 illustrate PDSCH regions according to embodiments of the present disclosure. The embodiments shown in FIGS. 15 through 20 are for illustration only. Other embodiments could be used without departing from the scope of this disclosure.

In some embodiments, BS 102 and BS 103 include synchronized, or matching, data regions of the PDSCH. The starting of the PDSCH joint transmission region depends on the system bandwidth of BS 102 (e.g., the anchor cell). The starting of the PDSCH region for CoMP joint transmission can be shown in Table 1 (which can be stored in each of the base stations).

TABLE 1

Starting OFDM Number of the PDSCH Region

| System Bandwidth of Anchor Cell $N_{RB}^{DL}$ | Starting OFDM Number |
|---|---|
| $N_{RB}^{DL} > 10$ | 3 |
| $N_{RB}^{DL} \leq 10$ | 4 |

Under this method, BS 102 and BS 103 start to map resource elements to the PDSCH starting from OFDM symbol number '3' if the system bandwidth of BS 102 is larger than 10 RB and from OFDM symbol number '4' if the system bandwidth of BS 102 is less or equal 10 RB.

For example, if $N_{RB}^{DL} > 10$ for a CoMP active set consisting of BS 102 and BS 103, assuming the PCFICH 1505 for BS 102 is '2' and the PCFICH 1510 for the BS 103 (e.g., the other transmitting cell) is '1', the PDSCH region 1515 of the BS 102 and BS 103 is illustrated in FIG. 15.

Figure 16:
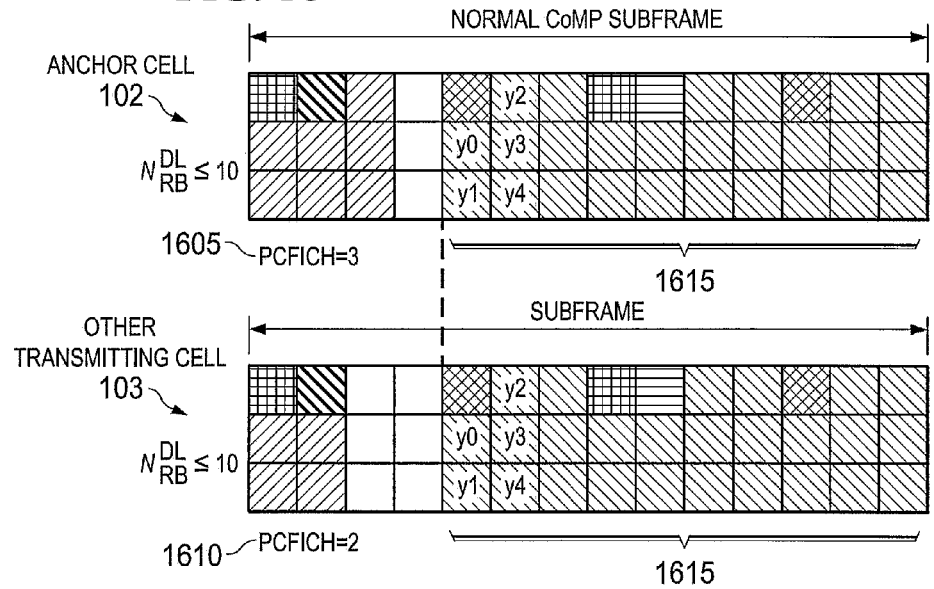

In another example, if $N_{RB}^{DL} \leq 10$ for a CoMP active set consisting of BS 102 and BS 103, assuming the PCFICH 1605 for BS 102 is '3' and the PCFICH 1610 for BS 103 cell is '2', the PDSCH 1615 region of BS 102 and BS 103 is be illustrated in FIG. 16.

In another embodiment, when the system bandwidths of BS 102 and BS 03 are different, SS 116 still expects the PDSCH of the joint transmission to start from the OFDM symbol number defined by the system bandwidth of BS 102 shown in Table 1. On the network side, if the system bandwidth of BS 103 is different from that of the BS 102, BS 103 may either change the starting position of the PDSCH joint transmission or puncture PDSCH coded bits to align to the PDSCH joint transmission region.

Figure 17:
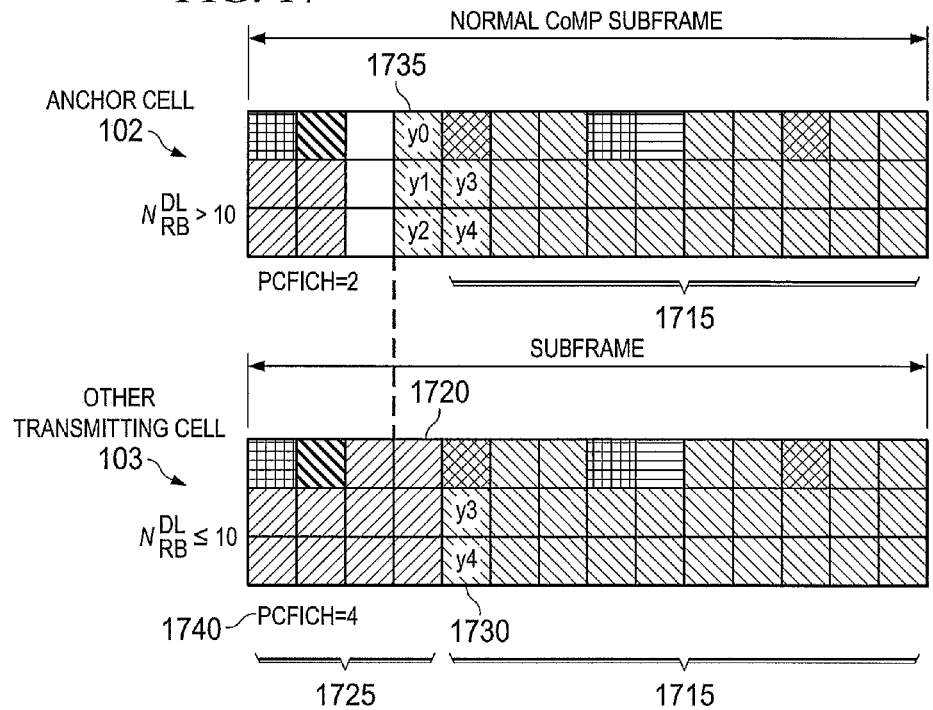

For example, as illustrated in FIG. 17, if $N_{RB}^{DL} > 10$ for BS 102, $N_{RB}^{DL} \leq 10$ for BS 103, and PCFICH=4, BS 103 punctures the resource elements 1720 of the PDSCH that overlaps with the control region in that cell. Under this situation, in BS 102, the block of complex-valued symbols $y^{(p)}(0), \ldots, y^{(p)}(M_{symb}^{ap}-1)$ mapped in sequence, starting with $y^{(p)}(0)$ 1735, to the starting of PDSCH region 1715. However, in BS 103, the block of complex-valued symbols $y^{(p)}(0), \ldots, y^{(p)}(M_{symb}^{ap}-1)$ is mapped to the resource elements starting from OFDM symbol number '3' 1720 instead of OFDM symbol number '4' 1730 as indicated by the PCFICH of BS 103 1740. Accordingly, BS 103 maps does not transmit the resource elements of the PDSCH corresponding to the OFDM symbol number '3' 1720 due to the overlap with the control region 1725. BS 103 transmits only the PDSCH starting from OFDM symbol '4' 1730.

Figure 18:
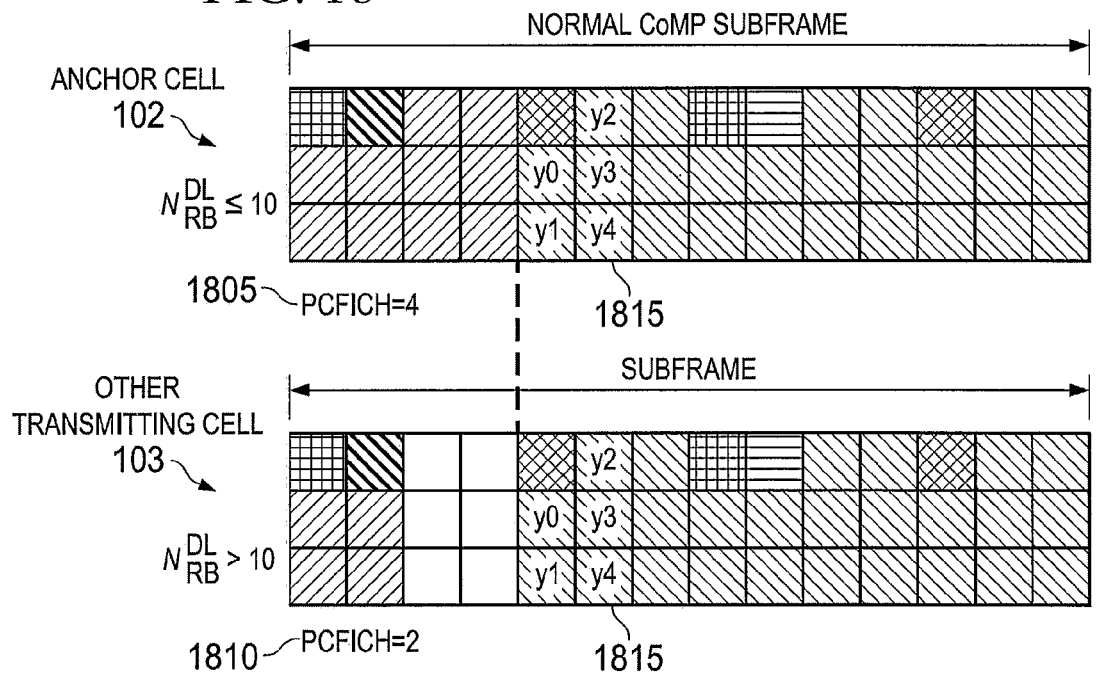

In yet another example illustrated in FIG. 18, if BS 102 has $N_{RB}^{DL} \leq 10$ with PCFICH=4, and BS 103 has $N_{RB}^{DL} > 10$ BS 103 starts resource mapping for PDSCH joint transmission from the resource elements 1815.

In some embodiments, the starting of the PDSCH joint transmission region depends upon the PCFICH 1805 of the BS 102. That is, SS 116 is expecting the joint PDSCH region to start from the OFDM symbol number indicated by the PCFICH 1805 number of BS 102. From network side, BS 103 may either puncture the resource elements of the joint PDSCH if its PCFICH 1810 value is greater than that of the BS 102 or start from the OFDM symbol number indicated by the PCFICH 1805 of BS 102 if its PCFICH value is smaller than that of BS 102.

Figure 19:
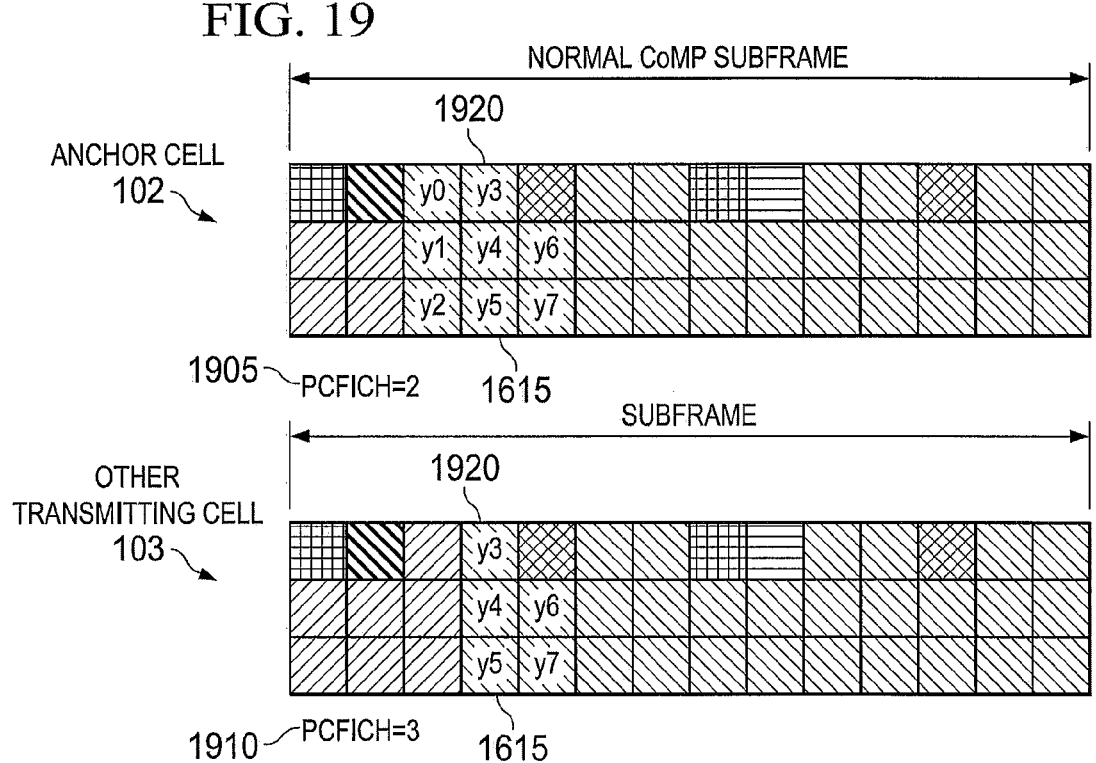

For example, as illustrated in FIG. 19 if the PCFICH 1805 of BS 102 is '2' while the PCFICH 1810 of BS 103 is '3', then BS 103 synchronizes with BS 102 in resource elements 1915 with OFDM symbol 'y3' 1920.

Figure 20:
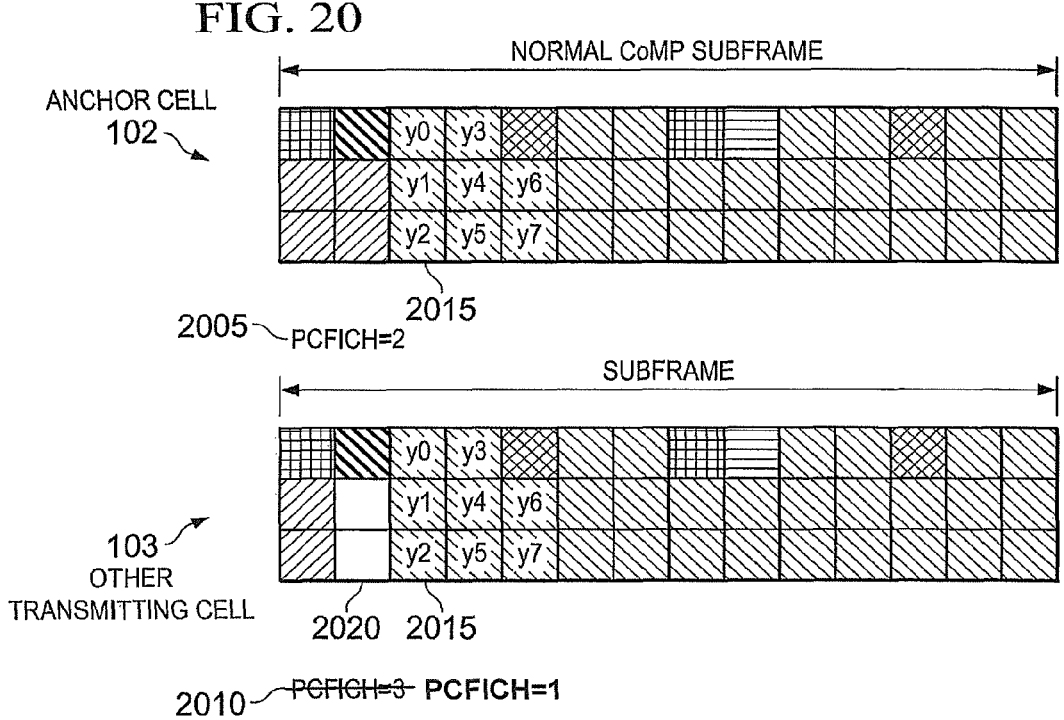

In another example, illustrated in FIG. 20, the PCFICH 2005 of BS 102 is '2' while the PCFICH of BS 103 is '1' 2010. Therefore, BS 103 punctures the RE's corresponding to the OFDM symbol number '2' 2020 and starts from the third column of REs corresponding to the OFDM symbol number '3' 2015, that is the OFDM symbol number indicated by the PCFICH of BS 102.

Figure 21:
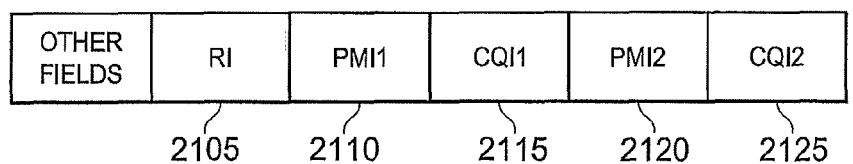
FIGS. 21 and 22 illustrate uplink control information (UCI) formats according to embodiments of the present disclosure.
Figure 22:
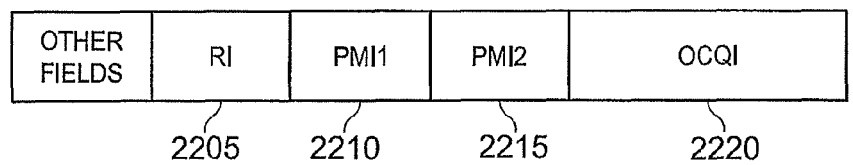

FIGS. 21 and 22 illustrate uplink control information (UCI) formats according to embodiments of the present disclosure. The embodiments illustrated in FIGS. 21 and 22 are for illustration only. Other embodiments could be used without departing from the scope of this disclosure.

In CoMP joint transmission, the transmission takes place across all the cells within the active CoMP set. Therefore, it is important to have the same information transmitted through the active CoMP set.

In some embodiments, all the cells within the active CoMP, such as BS 102 and BS 103, include the same rank for the downlink transmission. Further, in the corresponding CQI report of PUCCH, SS 116 uses the following UCI format 2C 2100. The UCI format 2C 2100 is shown for a system where SS 116 is configured in the COMP mode and is instructed to report PMI/CQI on two cells, such as BS 102 and BS 103.

The UCI format 2C 2100, illustrated in FIG. 21, includes a plurality of fields. The UCI format 2C 2100 includes a rank indication (RI) 2105, which is same across the active CoMP set (that is, the rank indication can be referred to as a common rank indication). The UCI format 2C 2100 also includes PMI1 2110, which is the precoding matrix indicator for BS 102 (e.g., cell 1). The UCI format 2C 2100 further includes CQI1 2115, PMI2 2120 and CQI2 2125. CQI1 2115 is calculated conditioned on RI 2105 and PMI1 2110 while treating other signals as interference. Accordingly, PMI2 2120 is the precoding matrix indicator for BS 103 (e.g., cell 2), and CQI2 2125 is calculated conditioned on RI 2105 and PMI2 2120 while treating other signals as interference.

In some embodiments, the UCI format used by SS 116 includes an overall CQI under the CoMP joint transmission. Here, SS 116 uses a new UCI format 2D 2200, illustrated in FIG. 22. The UCI format 2D 2200 is shown for a system where SS 116 is configured in the COMP mode and is instructed to report PMI/CQI for two cells, such as BS 102 and BS 103.

The UCI format 2D 2200 includes a plurality of fields such as RI 2205, PMI1 2210 and PMI2 2215. RI 2205 is the rank indication that is same across the active COMP set. PMI1 2210 is the precoding matrix indicator for BS 102 (e.g., cell 1) and PMI2 2215 is the precoding matrix indicator for BS 103 (e.g., cell 2). The UCI format 2D 2200 also includes an overall CQI (OCQI) 2220. OCQI 2220 is calculated conditioned upon the RI 2205, PMI1 2210 and PMI2 2215. Accordingly, SS 116 is configured to transmit the OCQI for use by both BS 102 and BS 103. Further, BS 102 and BS 103 are configured to determine their own CQI based on the RI 2205, PMI1 2210 and PMI2 2215 respectively.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a first base station configured to perform a coordinated multipoint transmission to a plurality of subscriber stations, the first base station comprising:
a plurality of antennas configured to transmit data and control information;
a transmitter coupled to the plurality of antennas, the transmitter configured to transmit a plurality of symbols in a sub-frame; and
a controller comprising processing circuitry configured to use a scrambling sequence for a physical downlink shared channel (PDSCH) that is the same as used by a second base station functioning as an anchor cell and performing coordinated multipoint transmission with the first base station, and to synchronize the transmission of the plurality of symbols by puncturing PDSCH symbols assigned to a first portion of a PDSCH of the first base station, the first portion corresponding to a second portion of a PDSCH of the second base station, the second portion overlapping with a control region of the first base station when the first base station has a control region size greater than a control region size in the second base station.

2. The first base station as set forth in claim 1, wherein the controller is configured to synchronize the transmission of the plurality of symbols by starting the transmission of the plurality of symbols with an equal symbol number in a corresponding resource element as in the transmission from the second base station.

3. For use in a wireless communication network, a first base station configured to perform a coordinated multipoint transmission to a plurality of subscriber stations, the first base station comprising:
a plurality of antennas configured to transmit data and control information;
a transmitter coupled to the plurality of antennas, the transmitter configured to transmit a plurality of symbols in a sub-frame; and
a controller comprising processing circuitry configured to synchronize the transmission of the plurality of symbols by puncturing PDSCH symbols assigned to a first portion of a PDSCH of the first base station, the first portion corresponding to a second portion of a PDSCH of the second base station, a second portion overlapping with a control region of the first base station when the first base station has a control region size greater than a control region size in the second base station.

4. The first base station as set forth in claim 3, wherein the controller is configured to receive an uplink control information message comprising a common rank indicator.

5. The first base station as set forth in claim 3, wherein the controller is configured to receive an uplink control information message comprising a common channel quality indicator.

6. For use in a wireless communication network, a subscriber station configured to receive a coordinated multipoint transmission from a plurality of base stations, the subscriber station comprising:
a plurality of antennas configured to receive data and control information; and
a receiver coupled to the plurality of antennas, the receiver configured to receive transmissions from at least two base stations using a same scrambling sequence for a physical downlink shared channel (PDSCH),
wherein a first of the base stations configured to function as a non-anchor cell uses the scrambling sequence generated by a second of the base stations configured to function as an anchor cell, and the first base station is configured to synchronize the transmission of the plurality of symbols by puncturing PDSCH symbols assigned to a first portion of a PDSCH of the first base station, the first portion corresponding to a second portion of a PDSCH of the second base station, the second portion overlapping with a control region of the first base station when the first base station has a control region size greater than the second base station.

7. The subscriber station as set forth in claim 6, wherein the physical downlink shared channel (PDSCH) transmission from the first base station is synchronized with the PDSCH from the second base station such that the transmission of a plurality of symbols from the first base station is based on a physical control format indicator of the second base station.

8. The subscriber station as set forth in claim 6, wherein the receiver is configured to receive punctured resource elements in the PDSCH of the transmission from the first base station.

9. The subscriber station as set forth in claim 6, wherein the transmission of a plurality of symbols from the first base station is synchronized by starting a transmission of a plurality of symbols with an equal number of symbols in a corresponding resource element in a transmission from the second base station.

10. For use in a wireless communication network, a subscriber station configured to receive a coordinated multipoint transmission from a plurality of base stations, the subscriber station comprising:
a plurality of antennas configured to receive data and control information; and
a receiver coupled to the plurality of antennas, the receiver configured to receive a transmission of a plurality of symbols from a first base station, wherein the transmission is synchronized by puncturing PDSCH symbols assigned to a first portion of a PDSCH of the first base station, the first portion corresponding to a second portion of a PDSCH of a second base station, the second portion overlapping with a control region of the first base station when the first base station has a control region size greater than a control region size in the second base station.

11. The subscriber station as set forth in claim 10, wherein the subscriber station further comprises a controller configured to transmit an uplink control information message to the plurality of base stations, the uplink control information message comprising a common rank indicator.

12. The subscriber station as set forth in claim 10, wherein the subscriber station further comprises a controller configured to transmit an uplink control information message to the plurality of base stations, the uplink control information message comprising a common channel quality indicator.

13. For use in a wireless communication network, a method for operating a first base station capable of performing a coordinated multipoint transmission with a plurality of subscriber stations, the method comprising:
transmitting a plurality of symbols in a sub-frame;
using, by a controller, a scrambling sequence for a physical downlink shared channel (PDSCH) that is the same as used by a second base station functioning as an anchor cell and performing coordinated multipoint transmission with the first base station; and
synchronizing, by the controller, the transmission of the plurality of symbols by puncturing PDSCH symbols assigned to a first portion of a PDSCH of the first base station, the first portion corresponding to a second portion of a PDSCH of the second base station, the second portion overlapping with a control region of the first base station when the first base station has a control region size greater than the second base station.

14. The method as set forth in claim 13, wherein synchronizing the transmission of the plurality of symbols comprises synchronizing the transmission of the plurality of symbols based on a physical control format indicator of the second base station.

15. The method as set forth in claim 14, wherein synchronizing the transmission of the plurality of symbols comprises starting the transmission of the plurality of symbols with an equal symbol number in a corresponding resource element as in the transmission from the second base station.

16. The method as set forth in claim 13, further comprising receiving an uplink control information message comprising a common rank indicator.

17. The method as set forth in claim 13, further comprising receiving an uplink control information message comprising a common channel quality indicator.

18. For use in a wireless communication network, a method for operating a first base station configured to perform a coordinated multipoint transmission with a plurality of subscriber stations, the method comprising:
transmitting a plurality of symbols in a sub-frame; and
synchronizing, by a controller, a transmission of the plurality of symbols by puncturing PDSCH symbols assigned to a first portion of a PDSCH of the first base station, the first portion corresponding to a second portion of a PDSCH of a second base station, the second portion overlapping with a control region of the first base station when the first base station has a control region size greater than the second base station.

19. The method as set forth in claim 18, wherein synchronizing the transmission of the plurality of symbols comprises synchronizing the transmission of the plurality of symbols based on a physical control format indicator of the second base station.

20. The method as set forth in claim 19, wherein synchronizing the transmission of the plurality of symbols comprises starting the transmission of the plurality of symbols with an equal symbol number in a corresponding resource element as in the transmission from the second base station.

21. The method as set forth in claim 18, further comprising receiving an uplink control information message comprising a common rank indicator.

22. For use in a wireless communication network, a first base station configured to perform a coordinated multipoint transmission to a plurality of subscriber stations, the first base station comprising:
a plurality of antennas configured to transmit data and control information;
a transmitter coupled to the plurality of antennas, the transmitter configured to transmit a plurality of symbols in a sub-frame; and
a controller comprising processing circuitry configured to use a scrambling sequence for a physical downlink shared channel (PDSCH) that is the same as used by a second base station functioning as an anchor cell and performing coordinated multipoint transmission with the first base station, and to synchronize the transmission of the plurality of symbols by starting the transmission of the plurality of symbols with an equal symbol number in a corresponding resource element as in the transmission from the second base station;
wherein a first number is used as the starting OFDM symbol number for the transmission of said plurality of symbols if the total number of resource blocks, representing the system bandwidth of the second base station, is greater than a threshold, and a second number, different from the first number, is used as the starting OFDM symbol number for the transmission of the plurality of symbols if the total number of resource block is less than said threshold.

23. For use in a wireless communication network, a first base station configured to perform a coordinated multipoint transmission to a plurality of subscriber stations, the first base station comprising:
a plurality of antennas configured to transmit data and control information;
a transmitter coupled to the plurality of antennas, the transmitter configured to transmit a plurality of symbols in a sub-frame; and
a controller comprising processing circuitry configured to synchronize the transmission of the plurality of symbols by starting the transmission of the plurality of symbols with an equal symbol number in a corresponding resource element as in the transmission from a second base station;
wherein a first number is used as the starting OFDM symbol number for the transmission of said plurality of symbols if the total number of resource blocks, representing the system bandwidth of the second base station, is greater than a threshold, and a second number, different from the first number, is used as the starting OFDM symbol number for the transmission of the plurality of symbols if the total number of resource block is less than said threshold.

24. The first base station as set forth in claim 23, wherein the controller is configured to receive an uplink control information message comprising a common rank indicator.

25. The first base station as set forth in claim 23, wherein the controller is configured to receive an uplink control information message comprising a common channel quality indicator.

26. For use in a wireless communication network, a subscriber station configured to receive a coordinated multipoint transmission from a plurality of base stations, the subscriber station comprising:
- a plurality of antennas configured to receive data and control information; and
- a receiver coupled to the plurality of antennas, the receiver configured to receive transmissions from at least two base stations using a same scrambling sequence for a physical downlink shared channel (PDSCH),
- wherein a first of the base stations configured to function as a non-anchor cell uses the scrambling sequence generated by a second base station of the base stations, the second base station is configured to function as an anchor cell, and the first base station is configured to synchronize the transmission of the plurality of symbols by starting the transmission of the plurality of symbols with an equal symbol number in a corresponding resource element as in the transmission from the second base station;
- wherein a first number is used as the starting OFDM symbol number for the transmission of said plurality of symbols if the total number of resource blocks, representing the system bandwidth of the second base station, is greater than a threshold, and a second number, different from the first number, is used as the starting OFDM symbol number for the transmission of the plurality of symbols if the total number of resource block is less than said threshold.

27. The subscriber station as set forth in claim 26, wherein the physical downlink shared channel (PDSCH) transmission from the first base station is synchronized with the PDSCH from the second base station such that the transmission of a plurality of symbols from the first base station is based on a physical control format indicator of the second base station.

28. The subscriber station as set forth in claim 26, wherein the receiver is configured to receive punctured resource elements in the PDSCH of the transmission from the first base station.

29. For use in a wireless communication network, a subscriber station configured to receive a coordinated multipoint transmission from a plurality of base stations, the subscriber station comprising:
- a plurality of antennas configured to receive data and control information; and
- a receiver coupled to the plurality of antennas, the receiver configured to receive a transmission of a plurality of symbols from a first base station, wherein the transmission is synchronized by starting the transmission of the plurality of symbols with an equal symbol number in a corresponding resource element as in the transmission from a second base station;
- wherein a first number is used as the starting OFDM symbol number for the transmission of said plurality of symbols if the total number of resource blocks, representing the system bandwidth of the second base station, is greater than a threshold, and a second number, different from the first number, is used as the starting OFDM symbol number for the transmission of the plurality of symbols if the total number of resource block is less than said threshold.

30. The subscriber station as set forth in claim 29, wherein the subscriber station further comprises a controller comprising processing circuitry configured to transmit an uplink control information message to the plurality of base stations, the uplink control information message comprising a common rank indicator.

31. The subscriber station as set forth in claim 29, wherein the subscriber station further comprises a controller comprising processing circuitry configured to transmit an uplink control information message to the plurality of base stations, the uplink control information message comprising a common channel quality indicator.

32. For use in a wireless communication network, a method for operating a first base station capable of performing a coordinated multipoint transmission with a plurality of subscriber stations, the method comprising:
- transmitting a plurality of symbols in a sub-frame;
- using, by a controller, a scrambling sequence for a physical downlink shared channel (PDSCH) that is the same as used by a second base station functioning as an anchor cell and performing coordinated multipoint transmission with the first base station; and
- synchronizing, by the controller, the transmission of the plurality of symbols by starting the transmission of the plurality of symbols with an equal symbol number in a corresponding resource element as in the transmission from the second base station;
- wherein a first number is used as the starting OFDM symbol number for the transmission of said plurality of symbols if the total number of resource blocks, representing the system bandwidth of the second base station, is greater than a threshold, and a second number, different from the first number, is used as the starting OFDM symbol number for the transmission of the plurality of symbols if the total number of resource block is less than said threshold.

33. The method as set forth in claim 32, wherein synchronizing the transmission of the plurality of symbols comprises synchronizing the transmission of the plurality of symbols based on a physical control format indicator of the second base station.

34. The method as set forth in claim 32, further comprising receiving an uplink control information message comprising a common rank indicator.

35. The method as set forth in claim 32, further comprising receiving an uplink control information message comprising a common channel quality indicator.

* * * * *